United States Patent [19]
Alfieri et al.

[11] Patent Number: 5,666,486
[45] Date of Patent: Sep. 9, 1997

[54] MULTIPROCESSOR CLUSTER MEMBERSHIP MANAGER FRAMEWORK

[75] Inventors: Robert A. Alfieri, Apex; James T. Compton, Durham, both of N.C.; Andrew R. Huber, Monroeville, Pa.; Paul T. McGrath, Raleigh, N.C.; Khaled S. Soufi, Durham, N.C.; Brian J. Thorstad, Cary, N.C.; Eric R. Vook, Chapel Hill, N.C.

[73] Assignee: Data General Corporation, Westboro, Mass.

[21] Appl. No.: 493,550

[22] Filed: Jun. 23, 1995

[51] Int. Cl.⁶ .................................................. G06F 15/16
[52] U.S. Cl. ...................... 395/200.47; 395/200.53; 364/131
[58] Field of Search ................ 395/200.01, 200.02, 395/200.03, 200.04, 200.05, 200.06, 200.08, 200.1, 200.12, 650; 364/131, 132, 133, 134, 942.3, 942.4, 942.5, 942.51, 942.6

[56] References Cited

U.S. PATENT DOCUMENTS

| | | | |
|---|---|---|---|
| 4,849,877 | 7/1989 | Bishop et al. | 364/200 |
| 4,980,857 | 12/1990 | Walter et al. | 364/900 |
| 5,202,971 | 4/1993 | Henson et al. | 395/425 |
| 5,390,316 | 2/1995 | Cramer et al. | 395/425 |
| 5,446,841 | 8/1995 | Kitano et al. | 395/200 |
| 5,448,470 | 9/1995 | Nishihata et al. | 364/131 |

*Primary Examiner*—Douglas W. Olms
*Assistant Examiner*—Matthew C. Phillips
*Attorney, Agent, or Firm*—Van Dyke, Gardner, Linn & Burkhart, LLP

[57] ABSTRACT

A shared-disk cluster system includes a cluster membership manager framework which coordinates the joining or leaving among all nodes in a cluster including taking the multiple layers of involved subsystems through transitions. Subsystems are notified of transitions in particular order depending upon the transition, and all nodes' subsystems receiving a notification must process that notification prior to another layer of subsystems being notified. One of the subsystems registered for notification is an event manager in user space. The event manager carries out transfers of client services, including user applications, resulting from nodes joining and leaving the cluster. This includes a registration and launch service which registers a node, or multiple nodes, in a cluster which claims, or is assigned, responsibility for the service and provides an optional launching function which initiates the client service upon successful registration.

44 Claims, 23 Drawing Sheets

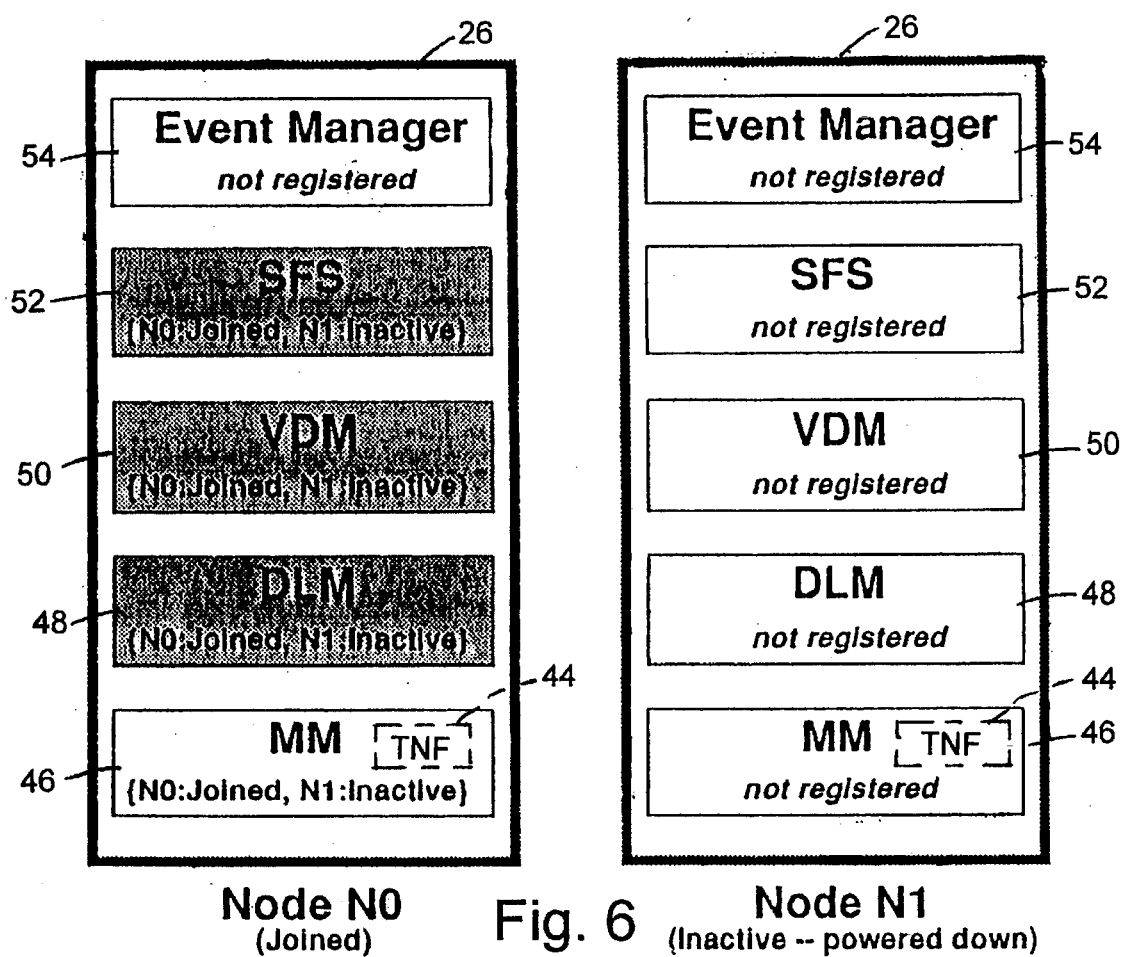

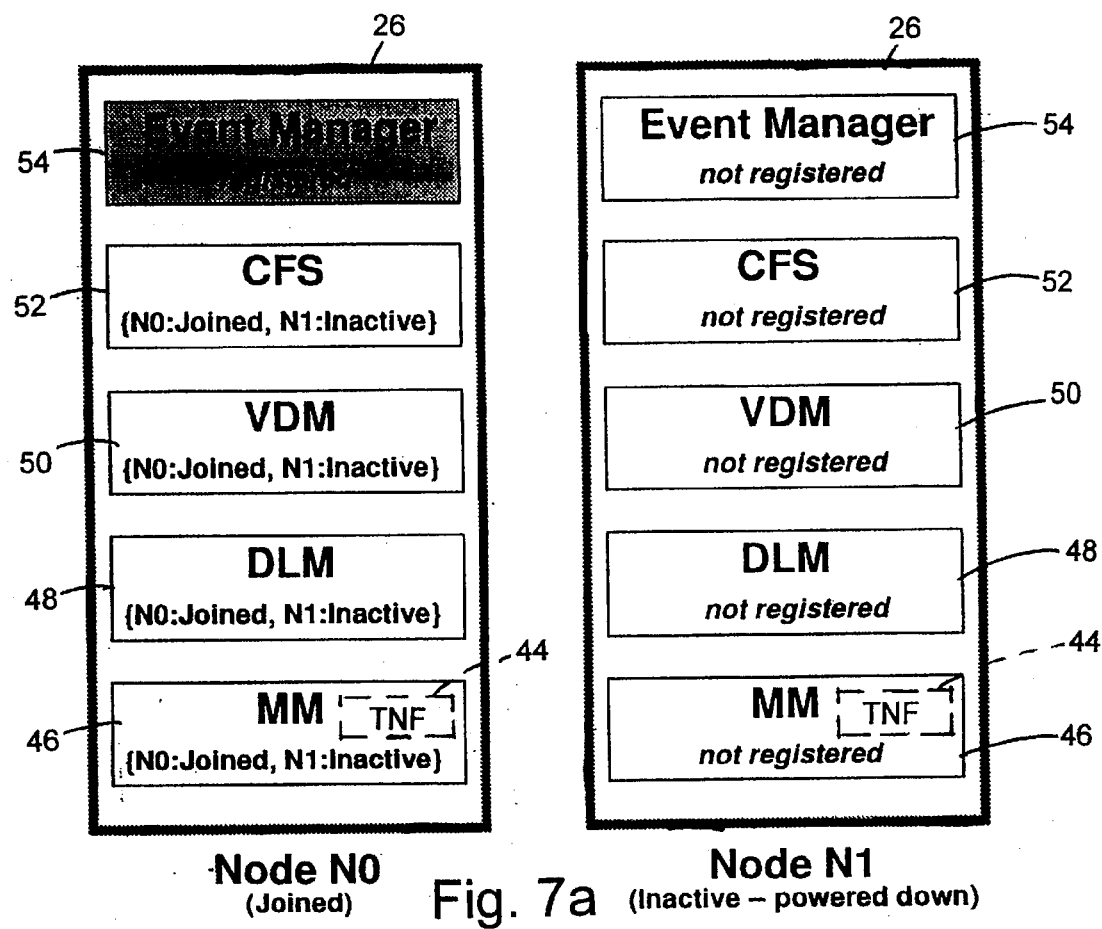

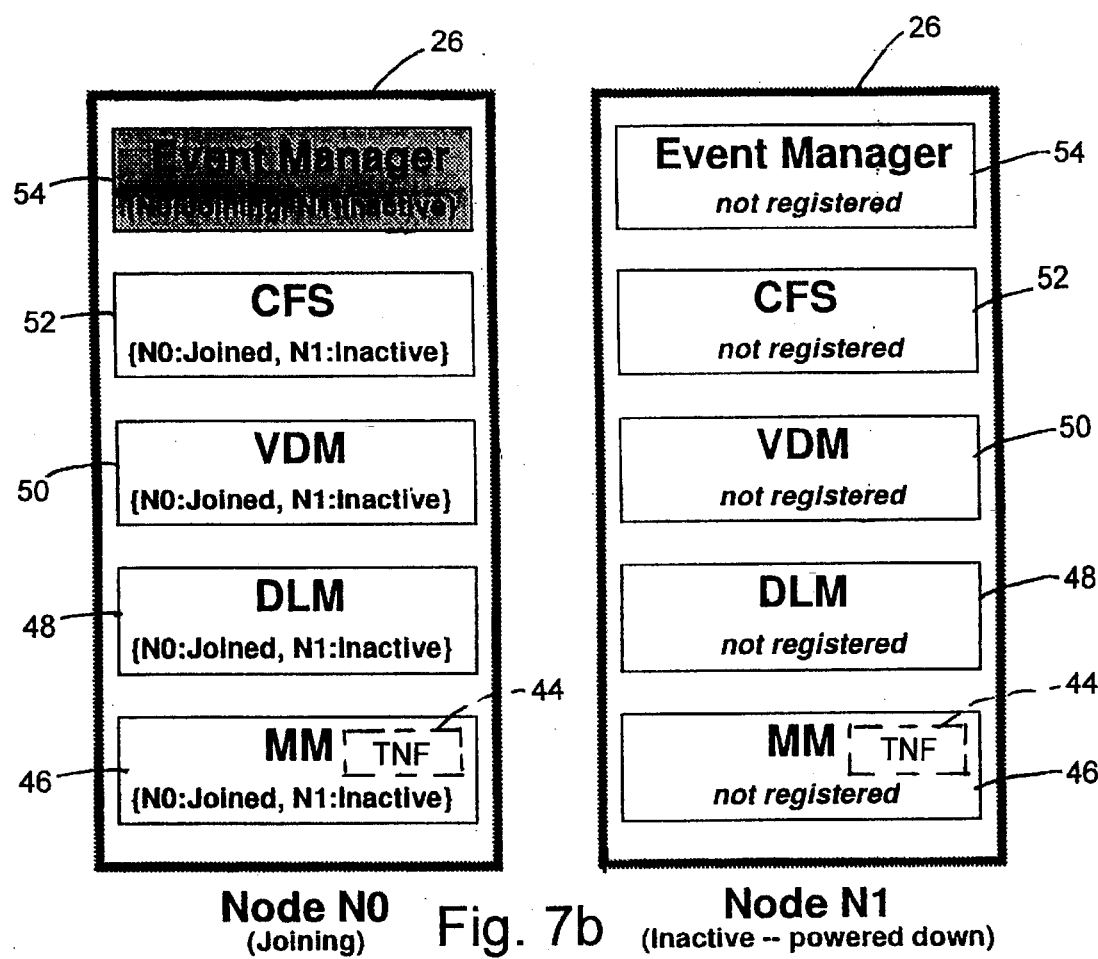

Node N0 (Joined)

Node N1 (Inactive -- powered down)

MULTIPROCESSOR CLUSTER MEMBERSHIP MANAGER FRAMEWORK

BACKGROUND OF THE INVENTION

This invention relates generally to multiprocessor systems and, more particularly, to shared-disk cluster systems. More particularly, the invention relates to a framework for joining and disjoining nodes in a multiprocessor cluster system.

A multiprocessor cluster system typically includes multiple nodes, which are interconnected with a private communication interconnect. The cluster system additionally includes a shared cluster resource, such as a virtual hard disk, which is accessible to all of the nodes, which run an operating system supporting coordinated access to the shared resource. Cluster systems have many advantages. They provide high availability to the user because availability does not depend upon all of the nodes being active participants in the cluster. One or more nodes may leave the cluster without necessarily affecting availability. New nodes may be added to the system without requiring that the system be taken down and rebooted. Additionally, nodes may incorporate processor designs that are different from one another, which facilitate expansion of the system. In this manner, the cluster system provides high aggregate performance.

Shared-disk cluster systems have typically been used for database services which require a distributed lock system in order to avoid contamination of data on the shared virtual disk. Membership management in such a cluster system required providing cluster awareness to the distributed lock system. However, such shared-disk cluster systems have been limited because cluster awareness extends to only one layer of subsystem. Particular operating systems have multiple subsystems which are layered in a manner that a higher level subsystem must depend upon the operation of lower level subsystems. Known cluster membership management techniques are not capable of taking such layered subsystems through cluster transitions of nodes joining and leaving the cluster.

Client services are typically distributed among the nodes of the cluster requiring extensive coordination of which node implements which service. This is especially difficult during node transitions of a node joining or leaving the cluster. This is because most services are not aware of the cluster environment. The client services would typically determine on their own the best node to execute on. A recovery mechanism would be required for initiating recovery if the node currently executing the service leaves the cluster. Allowing individual services to implement their own mechanism for this coordination requires detailed modifications to the client services to allow them to run on a cluster system which makes administration of the cluster more burdensome and difficult because inconsistent mechanisms may be used.

SUMMARY OF THE INVENTION

The present invention facilitates the use of multiprocessor cluster systems with operating systems having multiple subsystems which are layered by taking all of the involved subsystems through node transitions. The present invention also brings cluster awareness to non-cluster-aware client services, which include a wide variety of computing activities including user applications. This allows users to treat the cluster system as a single unit with the cluster system providing cluster-wide availability to the client service, including initiation of the client service on a particular node, migration of the client service between nodes, and termination of the client service.

The present invention provides a method and apparatus for combining particular processors, or nodes, of a multiprocessor system in a cluster that appears substantially as a unified processor to users of the system. According to an aspect of the invention, multiple subsystems running on nodes presently in the cluster are notified of transitions of nodes joining and leaving the cluster. This provides a consistent view of active membership in the cluster to the subsystems of the cluster nodes whereby all of the node's subsystems may be taken through the node transitions. This aspect of the invention is particularly useful with subsystems that are interdependent in levels, with higher level subsystems depending on the operation of lower level subsystems. A particular transition is noticed to the same level subsystem on all nodes. Notification will not proceed to another subsystem level until the noticed subsystem of each node processes that notification and acknowledges that such processing has been completed. When the transition is a node joining the cluster, subsystems are notified beginning with lower level subsystems and proceed in sequence through higher levels of subsystems. When the transition is a node gracefully leaving the cluster, subsystems are notified beginning with higher level subsystems and proceeding in sequence through lower level subsystems. When the transition is a node being ungracefully forced from the cluster by other nodes, subsystems are notified beginning with lower level subsystems and proceeding in sequence through higher level subsystems.

A registration and launch function is provided, according to another aspect of the invention, in which client services, including user applications, are initiated on particular nodes in a cluster in a manner that the cluster appears substantially as a uniform unit to the client services. A node is chosen for each client service and that client service is registered with the node. Nodes presently in the cluster are notified that the particular service is registered with the particular node. In this manner, client services can be transferred to another node if the node on which that service is registered leaves the cluster. The client service may be launched on a node, according to an action parameter included with the service, in response to registering that service with that node. This provides cluster-wide availability to client services because they will not need to explicitly initiate themselves each time they are transferred. Client services may, advantageously, be grouped as a parent service and one or more child services. Grouped client services are registered with the same node and utilize action parameters included with the parent service for all launching activity within the group. The choosing of a node for each client service may include providing a database of choosing factors for the client service and applying the choosing factors to information regarding the availability of the nodes in the cluster. The choosing factors establish rules relating nodes to the client service.

Such registration and launch function is preferably a component of an event manager, which is a subsystem which receives notification of node transitions from the cluster membership manager. The event manager monitors client services registered with a particular node using an event watcher and provides action items which are carried out in response to occurrence of an event, such as a node transition. The event watcher may be enabled in response to registering of a client service and disabled in response to de-registering of the client service.

These and other objects, advantages, and features of this invention will become apparent upon review of the following specification in conjunction with the drawings.

BRIEF DESCRIPTION OF THE DRAWINGS

FIGS. 3–10 are diagrams of states of subsystems in a two-node cluster illustrating nodes joining the cluster;

DESCRIPTION OF THE PREFERRED EMBODIMENT

HARDWARE

Figure 1:
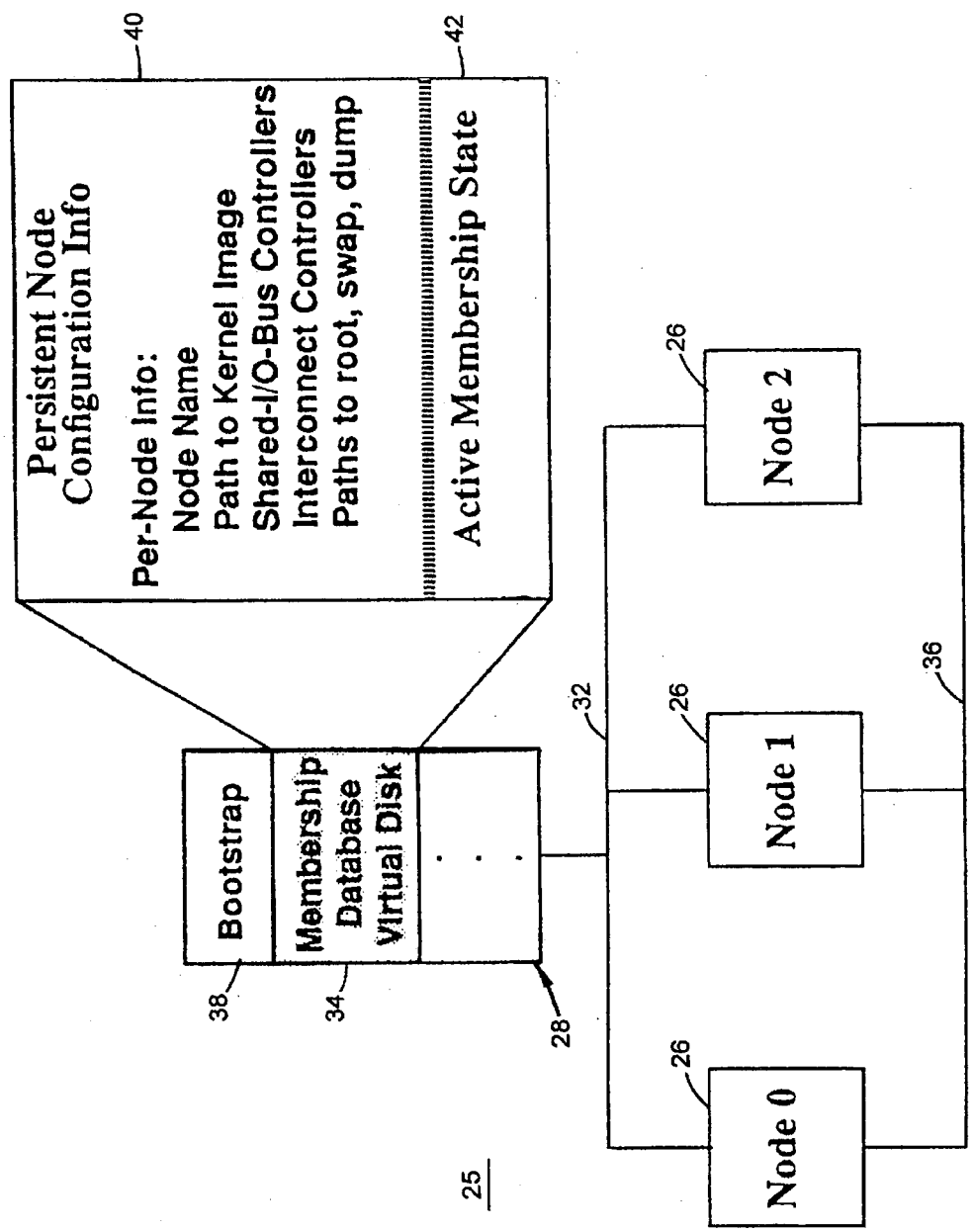
FIG. 1 is a block diagram of a multiprocessor cluster system according to the invention.

Referring now specifically to the drawings, and the illustrative embodiments depicted therein, a multiprocessor cluster system 25 includes multiple nodes 26 and a shared-cluster resource, such as a physical disk 28, which could be made up of multiple physical disk drives (FIG. 1). Each node 26 includes a processor (CPU), physical memory, caches, shared and private bus interfaces, and optional dedicated devices. Each node runs a copy of a UNIX-based operating system, such as DG/UX 5.4 operating system marketed by Data General Corporation of Westboro, Mass., running on any hardware configuration which supports such operation system. An example of such hardware configuration is the AViiON® family marketed by Data General.

Cluster system 25 additionally includes an interconnect 36, which is a dedicated shared-cluster communication media that allows nodes 26 to talk directly to all other nodes in the same cluster, and a shared-cluster I/O bus 32, which allows all nodes to share all devices physically connected to the shared bus, such as disk 28. In the illustrated embodiment, shared bus 32 is a SCSI standard bus.

SOFTWARE

Cluster system 25 includes a single membership database 34, which occupies a dedicated shared-cluster virtual disk, which lives on physical disk 28 along with a cluster-cognizant bootstrap 38. Membership database 34 manages persistent node configuration information 40 that is needed to boot, shutdown, or panic a node 26. Such persistent information includes identification of the number of nodes configured with the system, as well as configuration information about each node, indexed by a node identification number. Membership database 34 additionally includes an active membership state database 42, which contains transient information about node states. Such transient information changes dynamically as nodes join the cluster gracefully, gracefully leave the cluster, or are ungracefully forced out of the cluster. A node can have any one of the following states:

Inactive—The node is not configured or is not an active member of the cluster.

Joining—The node is in the process of joining the cluster, which implies that the node has informed other nodes of its intention to join the cluster gracefully, but not all of the registered subsystems of nodes in the cluster have completed transitions to gracefully include the new node.

Joined—The node has fully joined the cluster and all registered subsystems of nodes in the cluster accept the new node as a member of the cluster and have completed their transitions to include the new node.

Leaving—The node is in process of leaving the cluster, which implies that the node has informed other nodes of its intention to leave the cluster gracefully, but not all nodes' registered subsystems of nodes in the cluster have completed transitions to gracefully exclude the new node.

Forced-Leaving—Other nodes are in the process of forcing this node out of the cluster. Other nodes may force out a node if that node is not functioning properly, such as failing to communicate with other nodes. After the other nodes have completed processing of the forced-leave, which includes running recovery procedures, the other nodes mark this node as inactive. The forced-out node will panic after it has noticed that the other nodes have forced it out. A node panics by halting further processing in order to avoid corrupting shared cluster resources.

A. MEMBERSHIP MANAGER

Cluster system 25 includes a membership manager framework including a transition notification framework 44, which provides notifications to all kernel-level and user-level subsystems that must receive notifications of cluster transitions (FIGS. 2–15). The purpose of transition notification framework 44 is to provide cluster-cognizant subsystems, a coherent technique for processing cluster transition information among the nodes. Cluster-cognizant subsystems are subsystems which are registered with a node's cluster membership manager subsystem 46. In the illustrated embodiment, each node 26 includes four kernel-level subsystems, including cluster membership manager subsystem 46, which collectively provide transition notification framework 44, a distributed lock manager (DLM) subsystem 48, a virtual disk manager (VDM) subsystem 50, and a shared file system (SFS) subsystem 52. Each node 26 additionally includes at least one user-level subsystem; namely, an event manager subsystem 54. Such subsystems 46–54 are interdependent upon each other, in levels. In the illustrated embodiment, membership manager 46 is the lowest level subsystem and event manager 54 is the highest level subsystem. However, other higher level subsystems could be provided. A global transition ordering is provided for the subsystems, with lower level subsystems receiving smaller values and higher level subsystems receiving larger values.

Transition notification framework 44 operates as follows. Before a node joins a cluster, interested subsystems of that node register their intention to receive notifications of cluster transitions. A registered subsystem must also supply a thread of control that blocks waiting for transition notifications from membership manager subsystem 46 of that node. During graceful joins and forced leaves of nodes, all nodes' membership manager subsystems 46 coordinate to notify the node's registered subsystems in a bottom-up fashion with respect to the global transition-ordering scheme, as will be illustrated in more detail below. Thus, the membership manager subsystems notify, first, all of the node's subsystems with the lowest order followed by the next highest order, on up to the highest order. Conversely, during graceful leaves of nodes, all nodes' membership manager subsystems 46 coordinate to notify the node's registered subsystems in a top-down fashion, notifying first all nodes' subsystems with the highest order, followed by the next highest order, down to the lowest order. This ordering is so that higher level subsystems' dependencies on lower level subsystems are satisfied. That is, a lower level subsystem first processes a node join transition so that higher level subsystems can be ensured that the subsystems they depend upon, namely, lower level subsystems, are aware of and have completed processing of the join. Conversely, a higher level subsystem must first process a graceful leave so that the lower level subsystems remain operational in the leaving node during the leave transition. An ungraceful leave is processed from the bottom-up to ensure that all error conditions are propagated upward before attempting recovery at the next highest level.

Each node's membership manager subsystem will not proceed with notification to the next-in-line subsystem until each node's currently-in-line subsystem acknowledges its completion of processing for the transition. However, each node's membership manager subsystem may notify a registered subsystem to process multiple transitions for different nodes at the same time. Each of these transitions may be of a different type. This improves performance in situations where many nodes are undergoing transitions contemporaneously, such as when many nodes boot after a power failure that has powered down the entire cluster. However, each node's membership manager will not notify subsystems out-of-order for a particular transitional node. As a result, multiple transitions for different nodes may be processed at different subsystem levels at the same time, but the cluster membership manager framework will ensure proper subsystem ordering for each transitional node.

For examples of use of cluster subsystems to participate in graceful joins, graceful leaves, and ungraceful forced leaves utilizing transition notification framework 44, reference is made to FIGS. 2–15, which illustrate a cluster system having potentially a two-node cluster. The examples illustrated in FIGS. 3–15 may be generalized to three or more nodes with each node transition sequencing through each subsystem, one at a time, across all nodes. Each membership manager would not propagate the same node transition to the next highest subsystem until all nodes at the current level have acknowledged their completion of transition processing for the new node.

Figure 3:
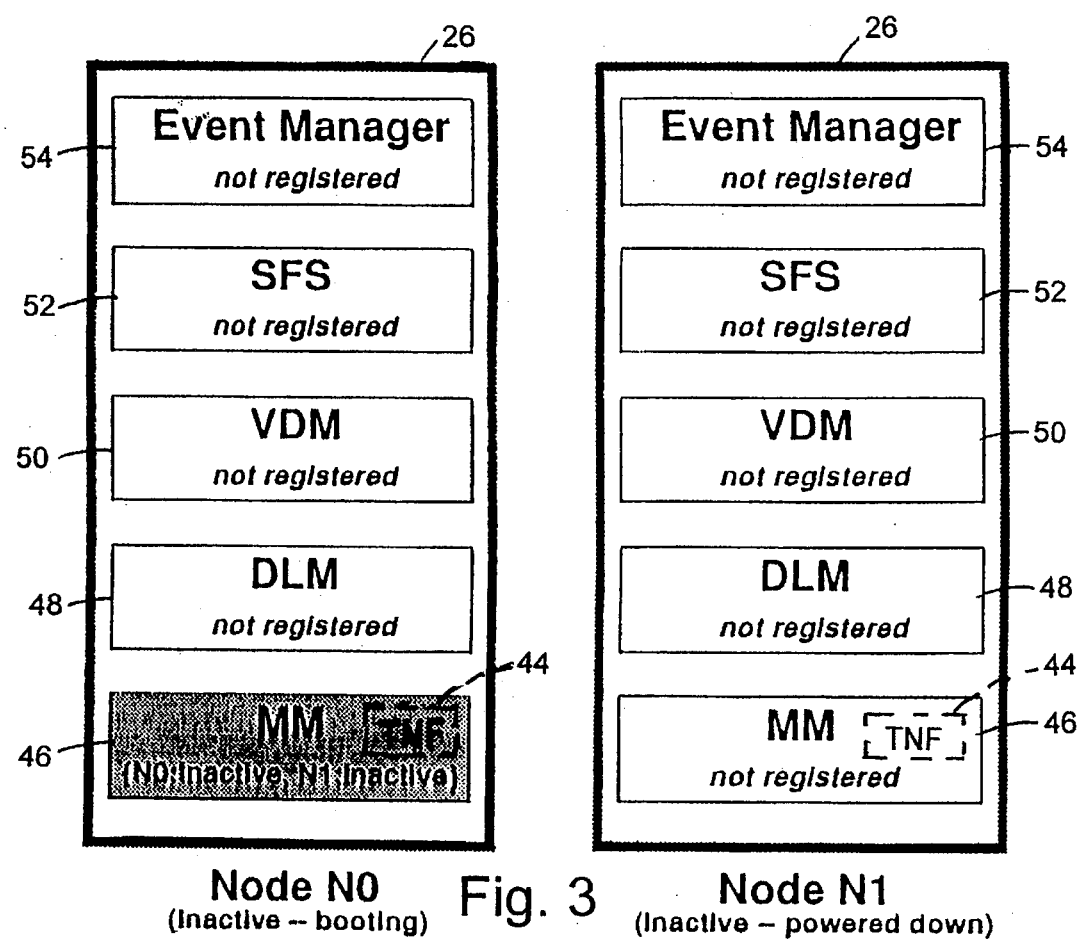
Figure 4:
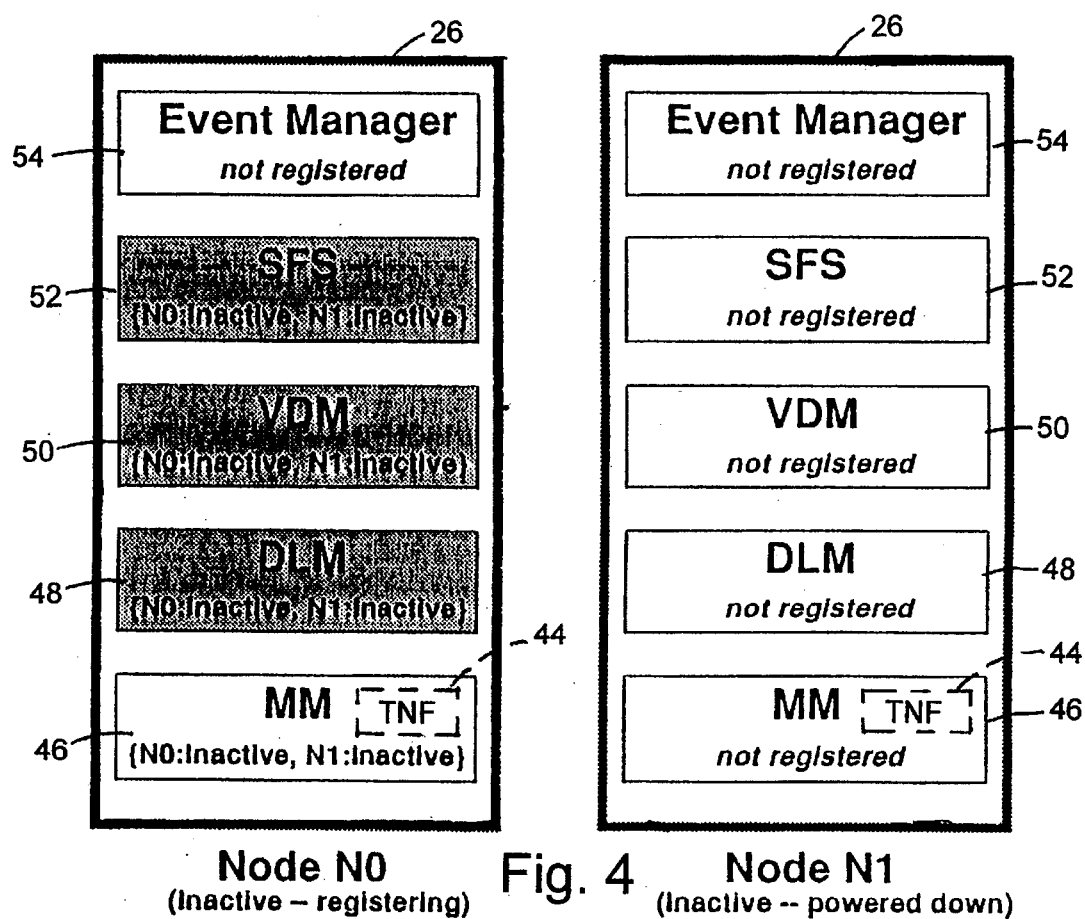
Figure 5:
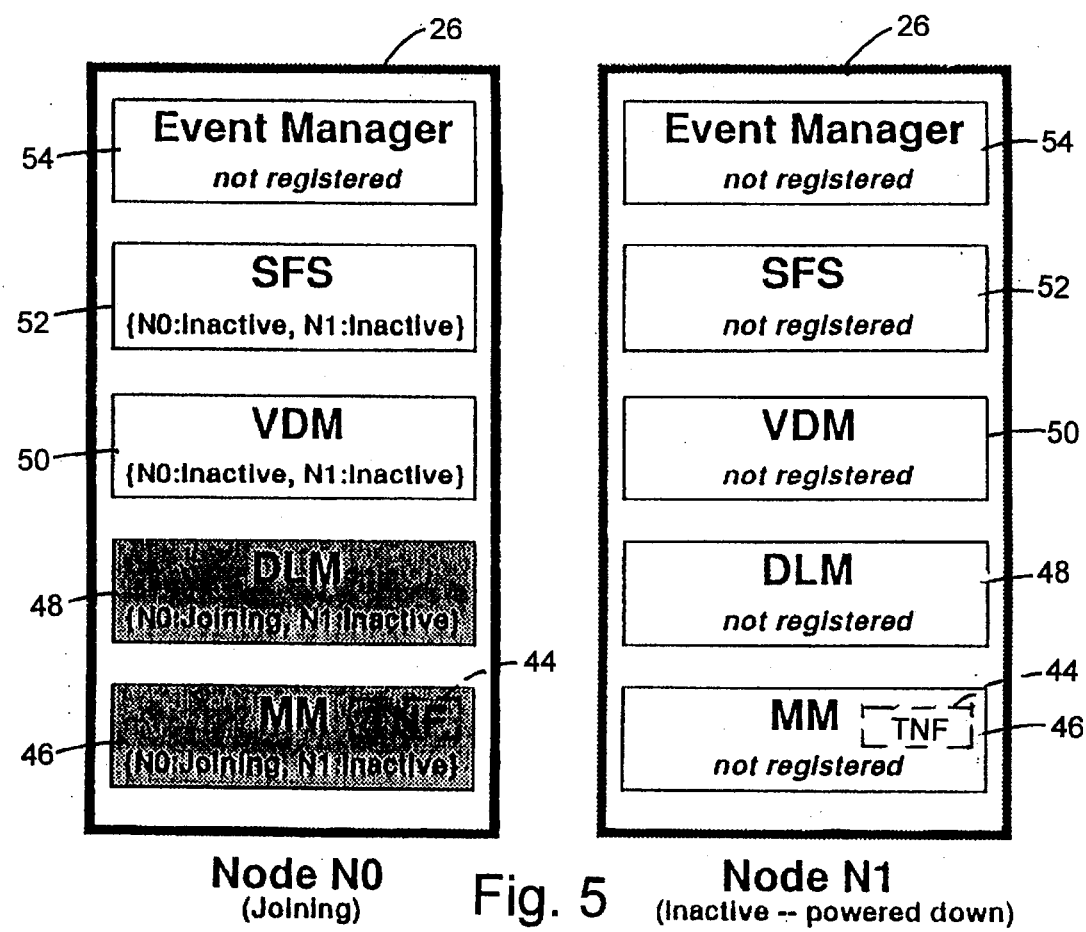

In the state illustrated in FIG. 3, the cluster contains no active members. The system administrator powers node N0 and begins its boot. Node N1 is left powered down. In order to gracefully join the cluster as the first active member, node N0 opens the cluster membership database 34 and retrieves its configuration information. Node N0 initializes its kernel subsystems 46–52, which each register themselves for transition notification (FIG. 4). The subsystems spawn a thread that makes a kernel call which blocks because no cluster transitions have occurred at this time. Node N0's INIT subsystem (not shown) initiates node N0's graceful join through the highest currently registered subsystem. Membership manager subsystem 46 of node N0 forms the cluster and marks node N0's active state as joining. Membership manager 46 of node N0 notifies its DLM subsystem 48 that node N0 is joining the cluster (FIG. 5). The thread of DLM subsystem 48 of node N0 is awakened, notices node N0's new joining state, hands the joined processing off to a different DLM thread, then completes its join. Node N0's DLM subsystem marks node N0's state as joined and informs membership manager 46 of node N0 that DLM has completed its joined processing for node N0. The same process is repeated for VDM subsystem 50 and SFS subsystem 52 of node N0 (FIG. 6).

Figure 7C:
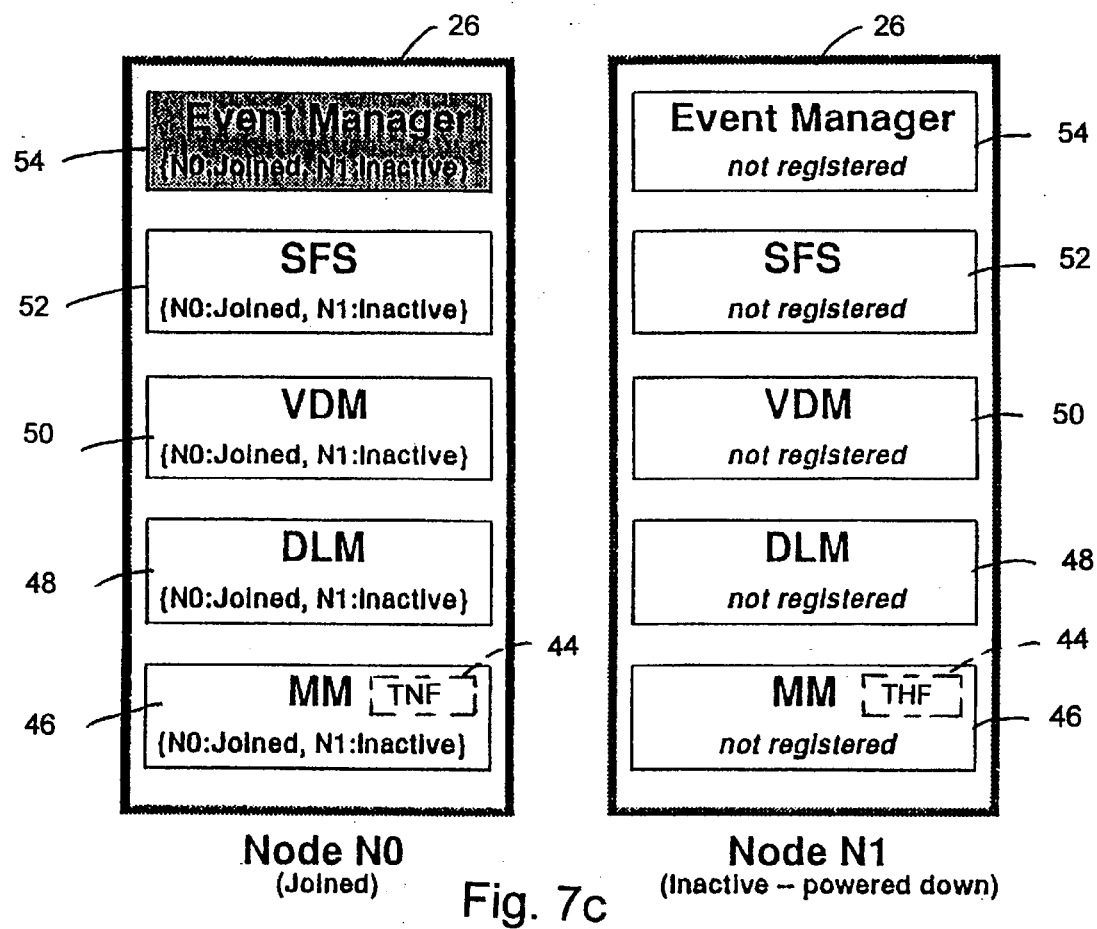

After having joined the cluster at the kernel level, node N0 proceeds to user space (FIGS. 7a–7c). Node N0's INIT subsystem (not shown) spawns event manager subsystem 54, which spawns a thread which returns immediately because the event manager 54 of node N0 has not yet processed node N0's graceful join. After having processed node N0's graceful join, node N0's event manager 54 marks node N0's state as joined and informs node N0's membership manager 46 that it has processed node N0's graceful join.

Figure 8:
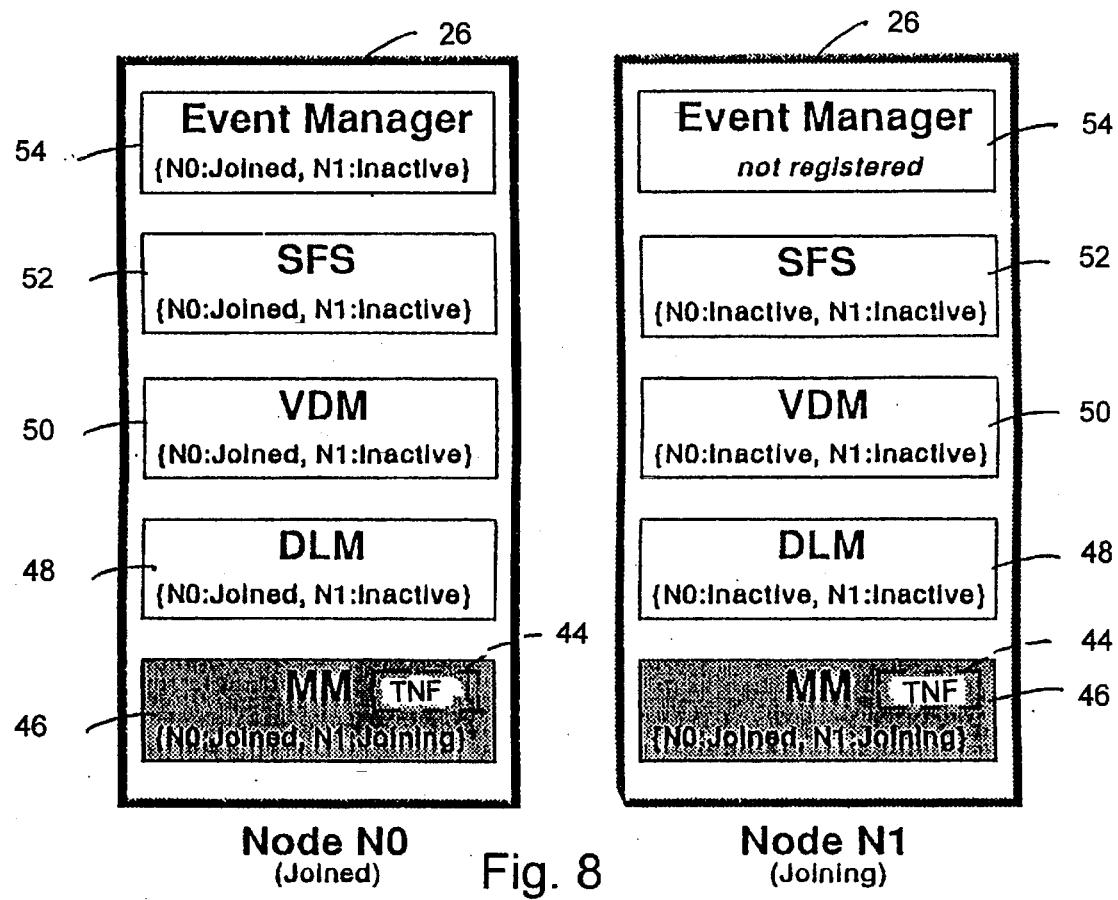
Figure 9:
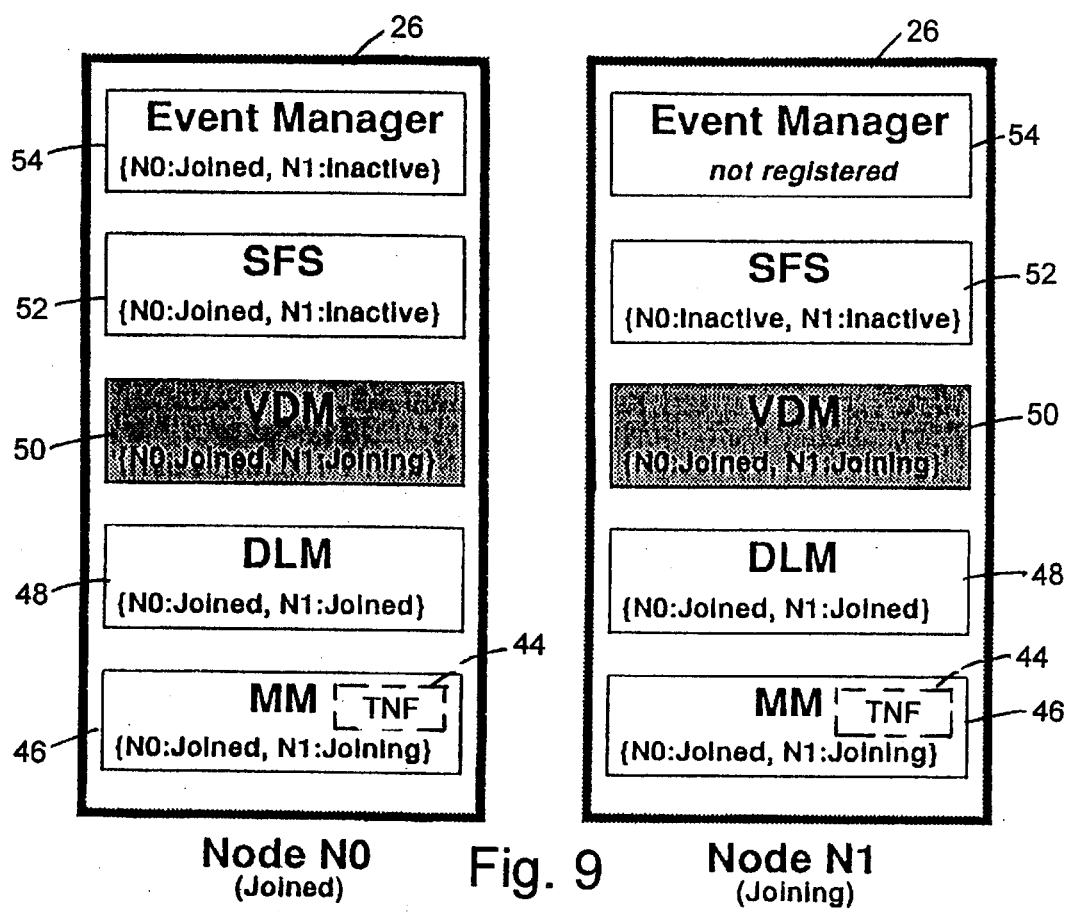

In FIG. 8, the administrator powers and boots node N1 which causes nodes N0 and N1 to perform a graceful join of node N1. Node N1 opens the membership database 34, retrieves it's configuration information and initializes its kernel subsystems 46–52, which register for transition notifications. The membership manager of joining nodes must negotiate with the cluster master node in order to join the cluster. When there are multiple nodes in the cluster, one node becomes the master node utilizing Decker's algorithm, which is known in the art. The master node writes its heartbeat in a particular area of membership database 34. Joining nodes will examine such area for the heartbeat in order to identify the master node. Membership manager subsystem 46 of node N1 negotiates with the membership manager of node N0, which must be the master node because it is the only node in the cluster, in order to join the cluster. The membership managers of nodes N0 and N1 mark the state of node N1 as joining the cluster. The membership managers of nodes N0 and N1 notify their respective DLM subsystems 48 that node N1 is joining the cluster. Both DLM subsystems wake up from their calls to begin processing node N1's graceful join. After both DLM subsystems have coordinated in processing node N1's graceful join, the DLM subsystems mark node N1's state as joined and acknowledge to the membership manager. After having received both DLMs' acknowledgements, the membership managers of nodes N0 and N1 notify the respective VDM subsystems 50 that node N1 is joining the cluster (FIG. 9). After both VDM subsystems have processed node N1's join, both subsystems mark node N1's state as joined and acknowledge the same to their respective membership managers.

Figure 10:
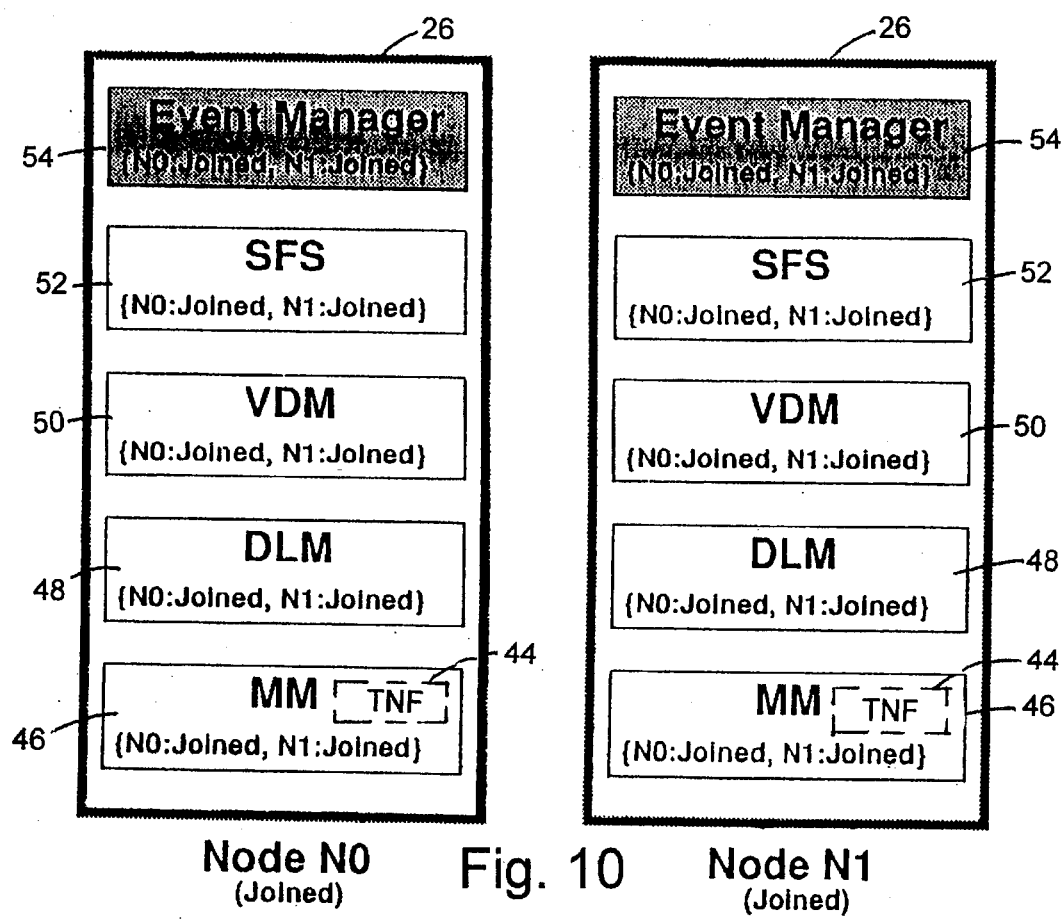

After having joined the cluster at the kernel level, node N1 proceeds to user space with its INIT subsystem (not shown) spawning event manager 54. Node N1's event manager registers itself with the membership managers. Node N1's event manager spawns a thread that makes a kernel call which is returned immediately because node N1's event manager must process node N1's graceful join. Node N0's event manager wakes up to process node N1's graceful join. After having coordinated to process node N1's graceful join, both event managers 54 mark node N1's state as joined and acknowledge the graceful join to their respective membership managers. Node N1 is joined as illustrated in FIG. 10.

A node may initiate a graceful leave while the node is still in the joining state. However, a joining subsystem will not convert the joining states directly to a leaving or an inactive state. The joining subsystem must complete and acknowledge the joined transition. The membership manager will only reverse the joining state to the leaving state between notifications to registered subsystem levels.

Figure 11:
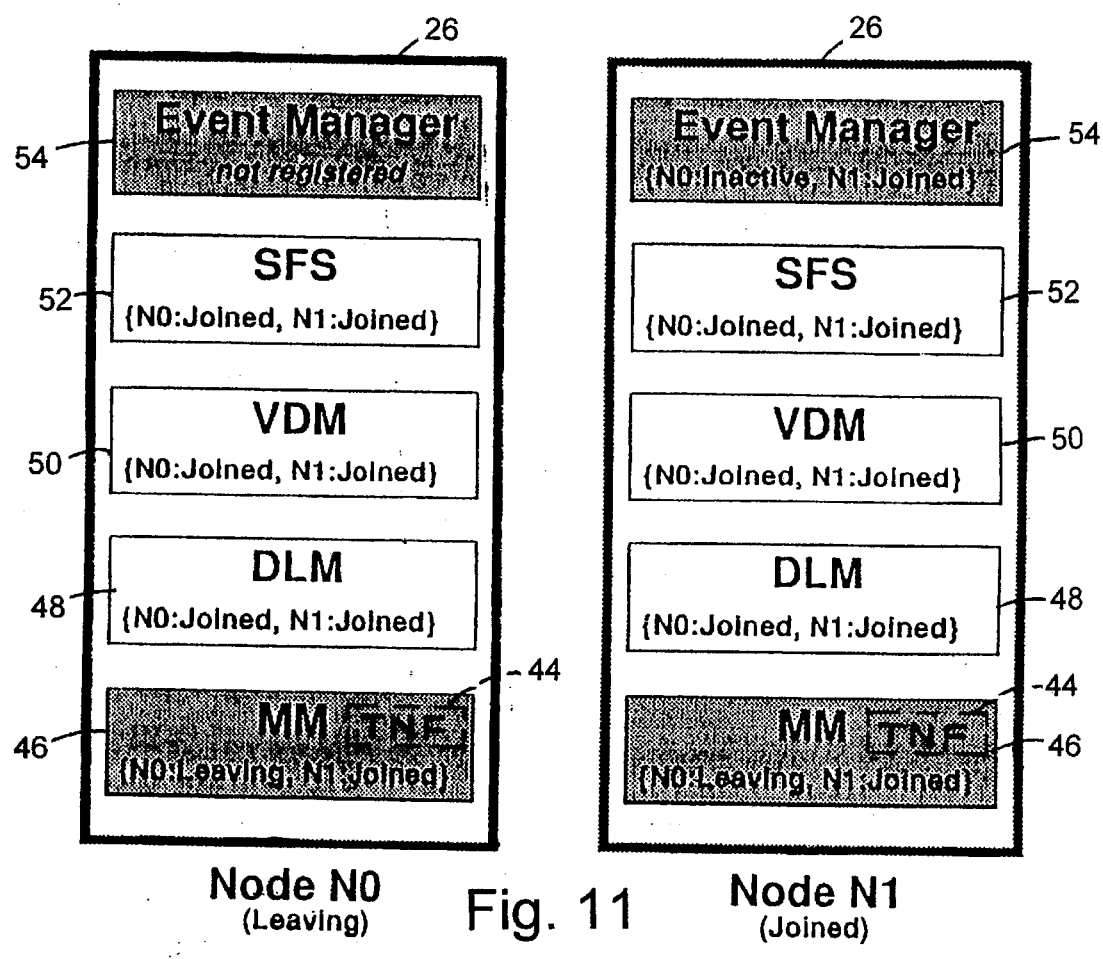
FIGS. 11 and 12 are diagrams of states of subsystem in a two-node cluster illustrating a graceful leave of a node from the cluster.
Figure 12:
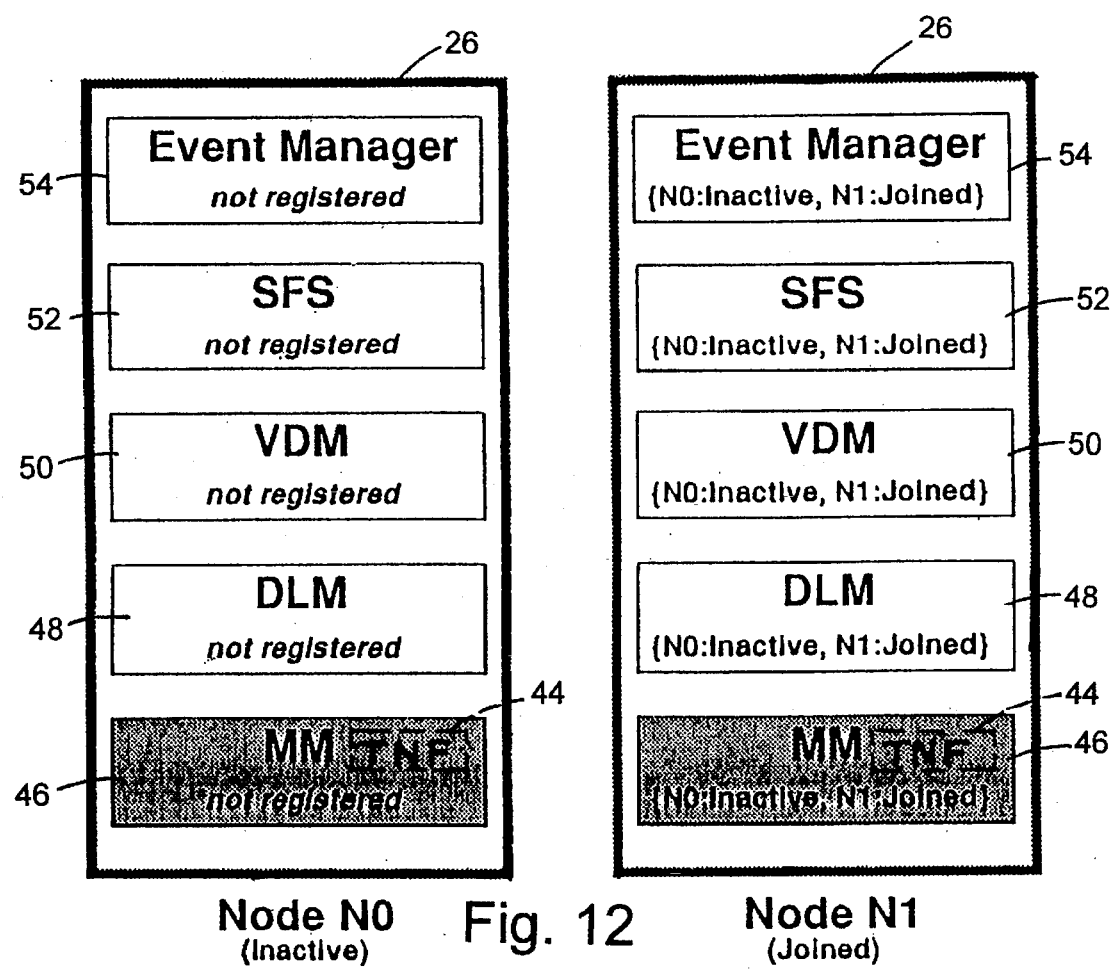

A processing, by transition notification framework 44, of a graceful leave of a node, such as what would occur during a shutdown of a node, is illustrated by reference to FIGS. 11 and 12. Node N0 initiates its shutdown by making the appropriate call to initiate a graceful leave. The membership manager subsystems of nodes N0 and N1 mark node N0 as leaving. The membership managers of nodes N0 and N1 wake up both event managers 54 with node N0's transition. Both event managers note node N0's state as leaving and begin their coordinated processing of node N0's graceful leave. As will be described in more detail below, the processing of node N0's graceful leave by both event managers may involve a considerable amount of application level shutdown, after which both event managers mark node N0 as inactive and notify their respective membership managers. Node N0's membership manager automatically de-registers node N0's event manager for transition notification whereby node N0's event manager will receive no further notifications. Next, the membership manager of nodes N0 and N1 perform the same iteration with the SFS subsystems 52 of both nodes, then with both VDM subsystems 50, and then DLM subsystems 48. Finally, the membership manager of both nodes mark node N0 as inactive, which also is the end of node N0's graceful leave. Node N0 performs kernel level shutdown processing and returns to the boot command line.

It should be noted that a node may not initiate a graceful join while other nodes are processing the node's graceful leave. In practice, this situation can occur when the leaving node has died abnormally and re-boots before other nodes have had a chance to notice that the leaving node has died. As soon as the other nodes notice that the leaving node has actually died, the other nodes will force the dead node out of the cluster, aborting their graceful leave processing. The other nodes will subsequently accept the new node's graceful join request.

An ungraceful, forced leave is an abnormal situation; for example, when a node is no longer capable of communicating with the other cluster nodes. Once the forced out node notices that the other nodes have forced that node out of the cluster, the forced-out node panics. Transition notification framework 44 ensures that the forced out node does not corrupt any shared-cluster resources. When a registered subsystem is in the middle of processing a graceful join or leave of the forced-out node, each node's membership manager could re-notify the processing subsystem to abort its graceful processing for the node and begin recovering processing.

Figure 13:
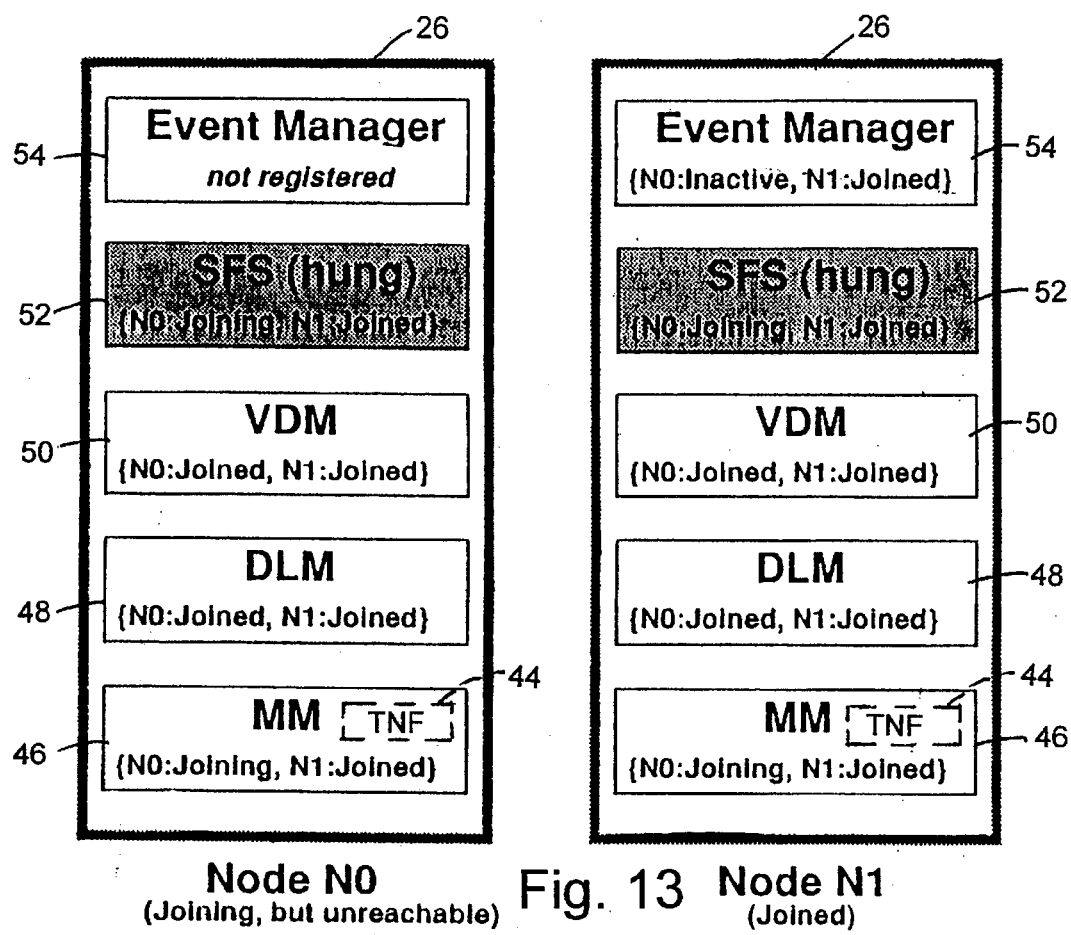
FIGS. 13–15 are diagrams of states of subsystems in a two-node cluster illustrating an ungraceful forced leave of a node from the cluster.
Figure 14:
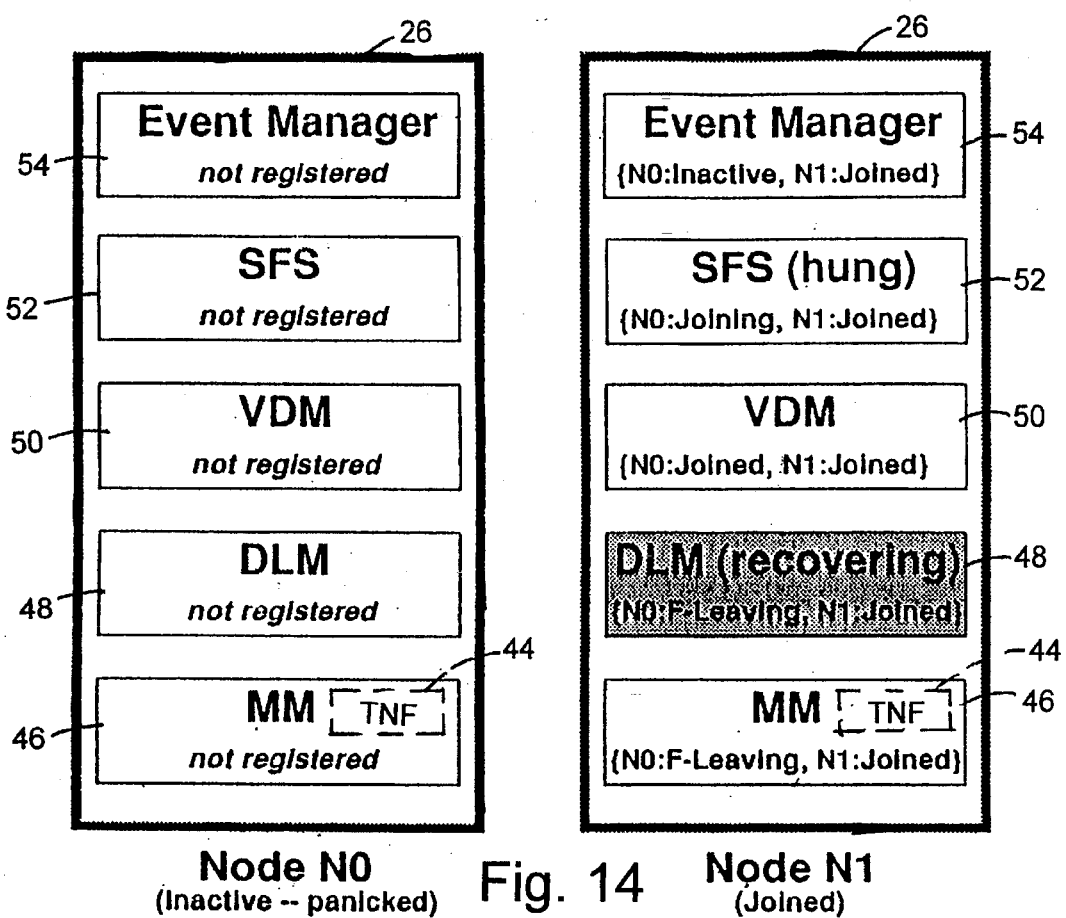
Figure 15:
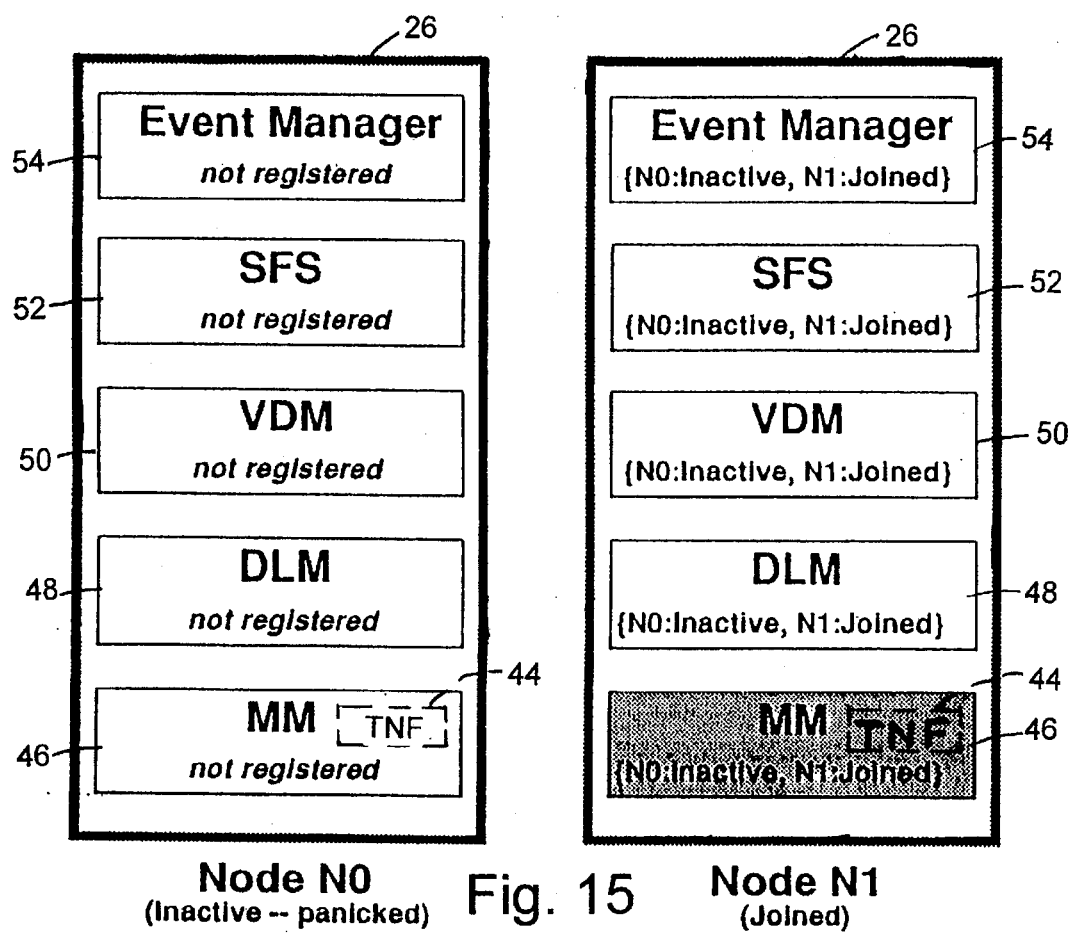

An example of a forced leave is illustrated with respect to FIGS. 13-15 which begins with node N1 being joined to the cluster and node N0 booting and joining the cluster gracefully. If, by way of example, the membership managers of nodes N0 and N1 have processed node N0's graceful join up through the VDM subsystems 50, but have not received an acknowledge from the SFS subsystems 52 of their completion of node N0's graceful join processing because the SFS subsystems of nodes N0 and N1 cannot communicate due to an interconnect failure on node N0, node N0's graceful join is noted as in a hung state (FIG. 13). The membership manager of node N1 notices that node N1 can no longer communicate with node N0. Node N1 forces node N0 out of the cluster by marking node N0's state as forced-leaving. The membership manager of node N0 notices that node N1 has forced out node N0 and panics immediately (FIG. 14). The membership manager of node N1 initiates forced-leave processing starting from the lowest level subsystem and proceeding up to the highest registered subsystem. The DLM subsystem 48 of node N1 marks node N0 as forced-leaving, notices the abrupt transition from joined and begins recovery processing, as illustrated in FIG. 14. After the DLM subsystem of node N1 acknowledges its completion of recovery processing for the forced-leave of node N0 by marking node N0's state as inactive, the membership manager of node N1 performs the same iteration with respect to VDM subsystem 50.

Node N0 may not re-join the cluster gracefully until all of node N1's subsystems have completed their processing of node N0's forced leave. When the membership manager of node N1 has finally caught up with SFS subsystem 52 of node N1, this subsystem will abort its processing of node N0's original graceful join and will perform recovery processing followed by an acknowledgement of its completion of the forced leave processing for node N0 by marking node N0's state as inactive. The membership manager of node N1 would normally continue iterating the forced-leave notification through the highest registered subsystem, event manager 54. However, because SFS subsystem 52 was the highest subsystem to be notified of node N1's graceful join attempt, forced-leave processing will progress only through the SFS subsystem. After processing the forced-leave notification through the highest appropriate subsystem, in this case the SFS subsystem, the membership manager of node N1 marks the state of node N0 as inactive (FIG. 15).

Table 1 illustrates, for a given transition node, the types of notifications that the membership manager will send to a registered subsystem and the corresponding acknowledgements that the membership manager expects to receive of the registered subsystem after the registered subsystem has completed its processing of the transition. Table 1 also lists the re-notifications that the membership manager may send to the registered subsystem while the registered subsystem is still processing the original notification for the transitional node.

Some registered subsystems may need to perform a two-or-more-phase commitment operation for one of the particular node transitions. In order to provide such multiple phase commitment, membership manager 46 provides barrier synchronization. Each registered subsystem may specify a number of barriers the subsystem wants for each type of node transition. The membership managers then provide notifications that are barrier-synchronized with subsystem levels. All nodes at a given subsystem level must acknowledge its completion of the transition processing for the particular barrier before the membership manager will proceed to the next-in-order subsystem. For example, if the DLM subsystem asks for two "joining" barriers during a joining transition, all DLM subsystems must acknowledge joining barrier 0 before they will be notified of barrier 1. After they acknowledge barrier 1, the joining transition will propagate to the VDM subsystem, which may have a different number of barriers. Also, all subsystems at a particular level must register with the same number of barriers for each type of transition.

Figure 2:
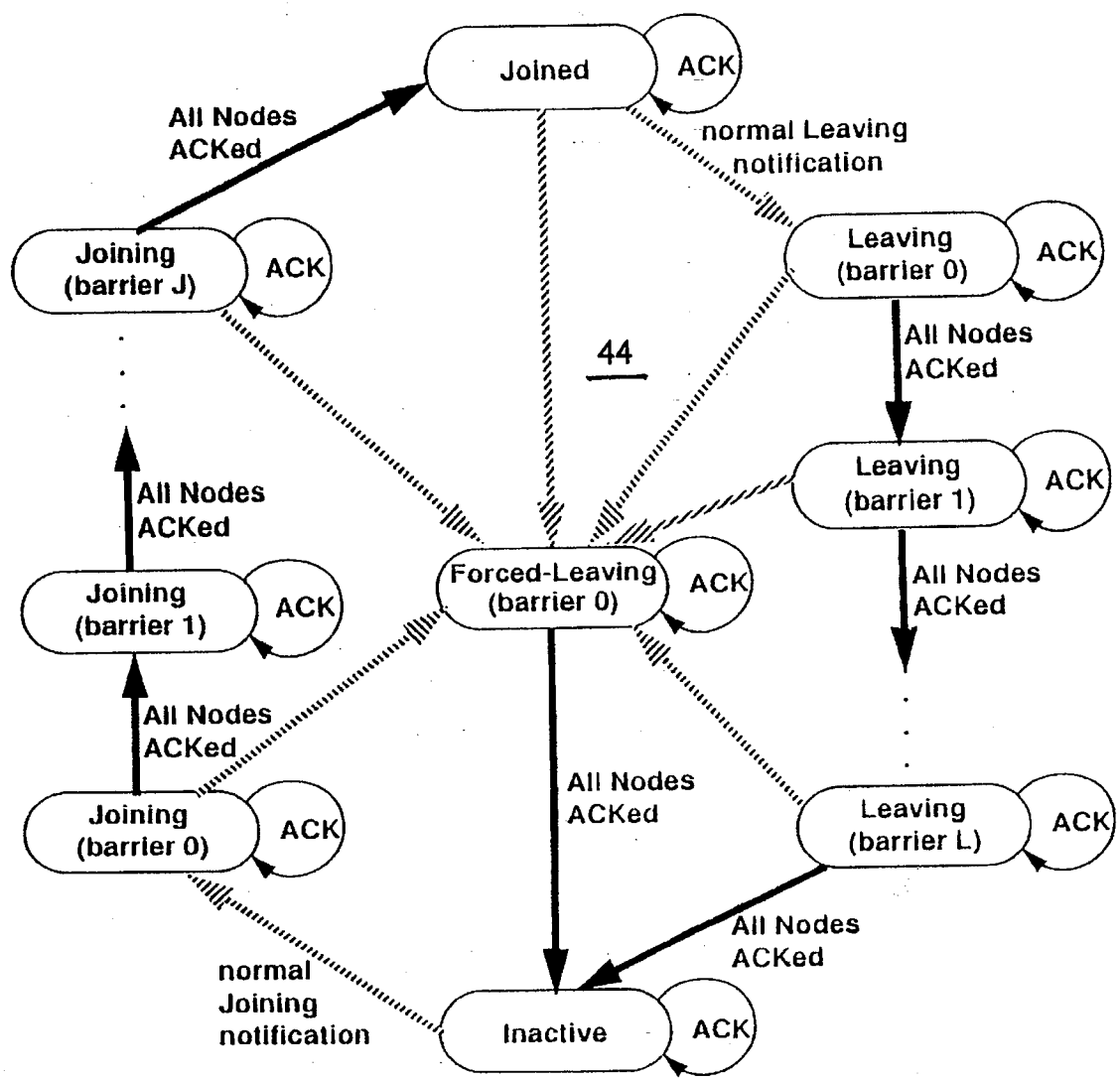
FIG. 2 is a state transition diagram of a transition notification framework for one subsystem level.

A state-diagram for transition notification network 44 is illustrated in FIG. 2 to illustrate the types of notifications that an individual registered subsystem may receive for a node transition. As may be observed in FIG. 2, transitioning may proceed through multiple barriers for each transition type. For clarity, only one barrier is illustrated for forced-leaving. However, multiple barriers are allowed. Dashed lines represent transition notifications. Solid lines represent acknowledgements from the individual subsystem on a single node or across all nodes.

TABLE 1

MEMBERSHIP MANAGER NOTIFICATIONS OF TRANSITIONS FOR A PARTICULAR NODE TO A REGISTERED SUBSYSTEM AND EXPECTED ACKNOWLEDGEMENTS FROM THE REGISTERED SUBSYSTEM

| Sent Notification (from MM to subsystem) | New State After All Nodes Have Acknowledged | Allowed Re-Notifications (from MM to subsystem) | Notes |
| --- | --- | --- | --- |
| Joining | Joined | Forced-Leaving | Straightforward, but this subsystem must keep a lookout for the Forced-Leaving re-notification and abort its graceful join in a timely fashion. |
| Leaving | Inactive | Forced-Leaving | Straightforward, but this subsystem must keep a lookout for the Forced-Leaving re-notification and abort its graceful leave in a timely fashion. |
| Forced-Leaving | Inactive | None | Causes this subsystem to abort any graceful join or leave processing for the node. |
| Inactive | Inactive | Joining | MM should never send only an Inactive notification to this subsystem. MM sends this state along with real transition notifications for other nodes. |
| Joined | Joined | Forced-Leaving | MM should never send only a Joined notification to this subsystem. MM sends this state along with real transition notifications for other nodes. |

B. EVENT MANAGER

Figure 20:
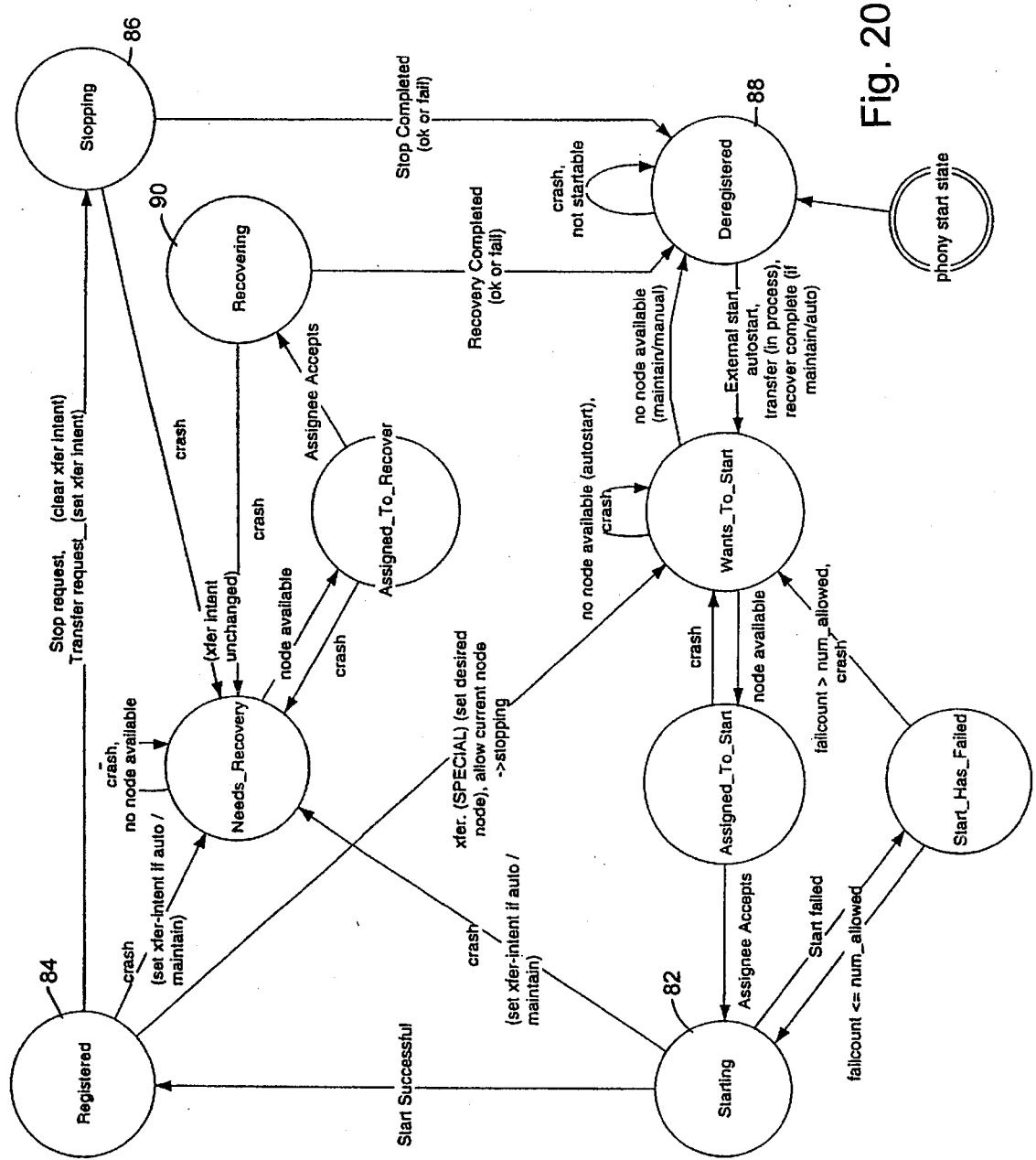
FIG. 20 is similar to FIG. 18 illustrating additional transition states.
Figure 21:
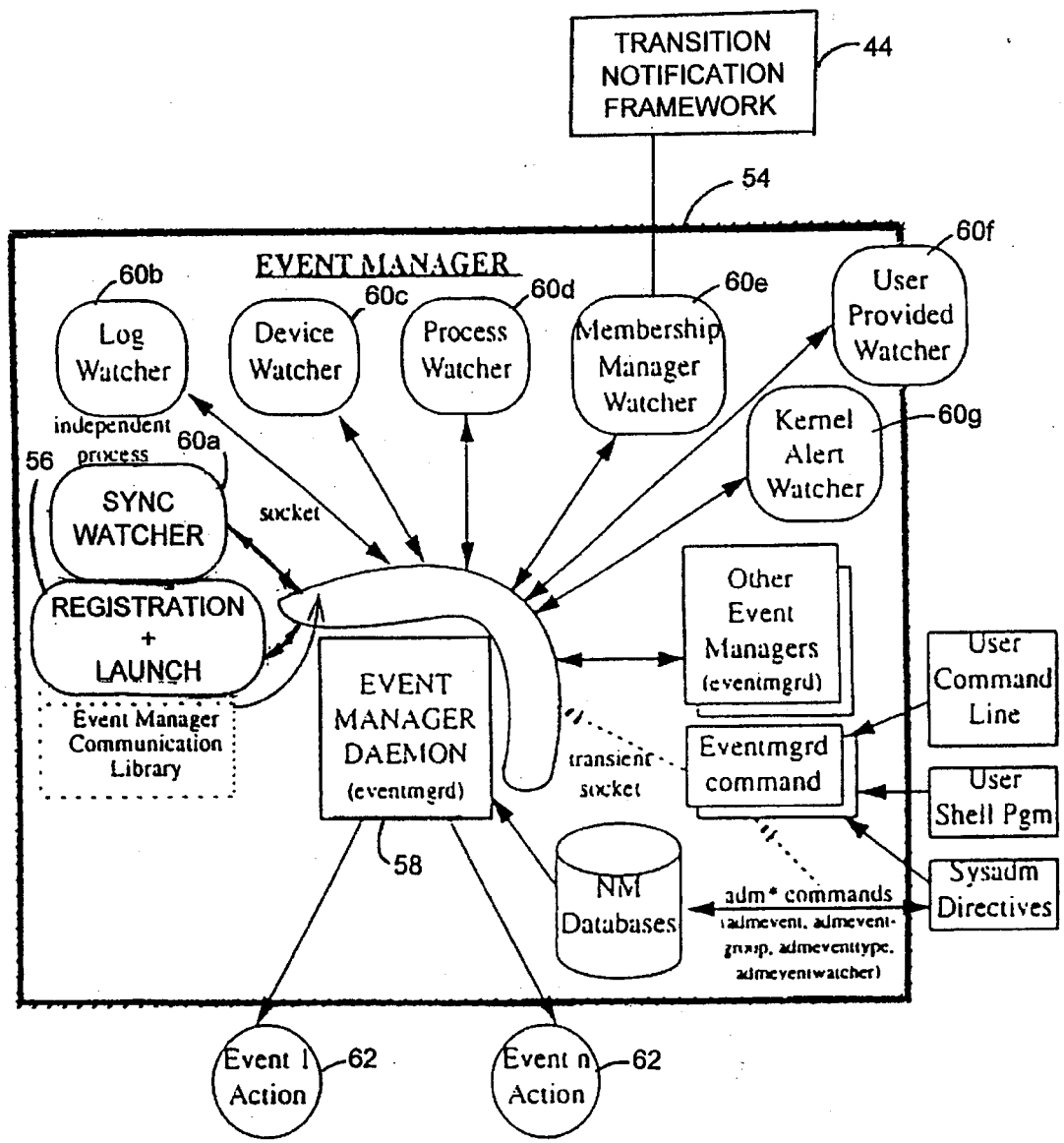
FIG. 21 is a block diagram of an event manager subsystem according to the invention.

Event manager subsystem 54 is a user space subsystem which provides cluster-wide availability to client services. This latter function is performed by a registration and launch service 56 (FIGS. 16–21) which is a component of event manager subsystem 54 (FIG. 21). Event manager subsystem 54 includes an event manager daemon 58 having multiple watchers 60a–60g which monitor for particular conditions. If a watcher detects a problem, the event manager subsystem 54 will resolve the problem via action functions 62. Registration and launch service 56 may be considered a watcher of event manager daemon 58, but performs additional useful functions as will be explained in more detail below.

A client service is any computing activity, including user applications, which is performed on one node or on more than one node in a cluster. One difficulty is determining which node or nodes should initially provide each client service. Additionally, there must be coordination of which node implements which services during a failure scenario. If individual client services were to implement their own mechanisms for determining the best location to execute, and for initiating recovery if the node currently providing the services leaves the cluster, a heavy burden would be placed upon the administrative management of the cluster. Registration and launch service 56 provides cluster awareness to non-cluster-aware applications by choosing which node a client service will execute on, registering the client service with that node, and notifying nodes presently in the cluster that the particular client service is registered with that node. Registration and launch service 56 additionally will provide an optional launching, or execution, capability, which is invoked when the service is registered at a particular node. The launching capability can additionally be used to transfer a service from one node to another in a controlled fashion. The launching capability, referred to as "action functions," enhances cluster-wide availability by providing the ability to initiate, migrate, and terminate client services. Such transfers of the client service may result, for example, from nodes joining and leaving the cluster. Examples of services which may make principle use of the registration and launch service include, by way of example, printing subsystems, floating internet protocol (IP), networking services, and license server, although other services may advantageously make use of the registration and launch service.

1. Registration

Registration is the process where one node, or more than one node, in a cluster can claim, or is (are) assigned, responsibility for a previously defined client service. It is performed on a cluster-wide atomic basis. A registration indicates a claim of responsibility that the registered node is fulfilling the obligations of the specified client service. As a consequence of registration, or de-registration, optional service start-up, notification, and shut-down commands, known as "action functions", will be invoked. In this manner, registration may initiate, or launch, the client service and provide cluster awareness to the user service. Cluster awareness is a result of notification, upon completion of registration, to other nodes in the cluster, as well as nodes subsequently joining the cluster, of the registration.

2. Choosing

The choice of which node is assigned a particular responsibility, as part of a registration operation, is guided by a set of choosing parameters, or database items, 64. These choosing parameters may include a set of database items which specify when, where, and under what conditions a service should be registered. However, additional criteria may be included in the choosing function including recent performance statistics of particular nodes. Administrator-supplied priority factors may be selected as follows:

Allowable_Nodes—The nodes from the cluster where registration is allowed. All nodes must be potential members of the cluster although they need not be powered up. A single wildcard character may be utilized to designate all potential nodes of the cluster.

Node Preferences—Node preferences result from the fact that not all nodes will support all client services equally well. Node preferences may be specified as an unordered list or as an ordered list. Selection among unordered members will be influenced by recent performance characteristics of the cluster. Ordered lists are processed beginning with the highest rank member.

Disallowable_Nodes—The nodes from the cluster where registration is not allowed. Adding a node to a client service's disallowable_node's field does not automatically initiate a transfer of the service.

Auto_Register—This is used when the cluster is first powered up, wherein each user client service potentially needs to be registered and started. The auto-register field allows the administrator to define under what conditions a service should be registered.

Placement_Policy—This indicates what type of registering philosophy is in place; namely, whether the client service is to be registered on exactly one node or is to be registered and started on every allowable_node.

Figure 18:
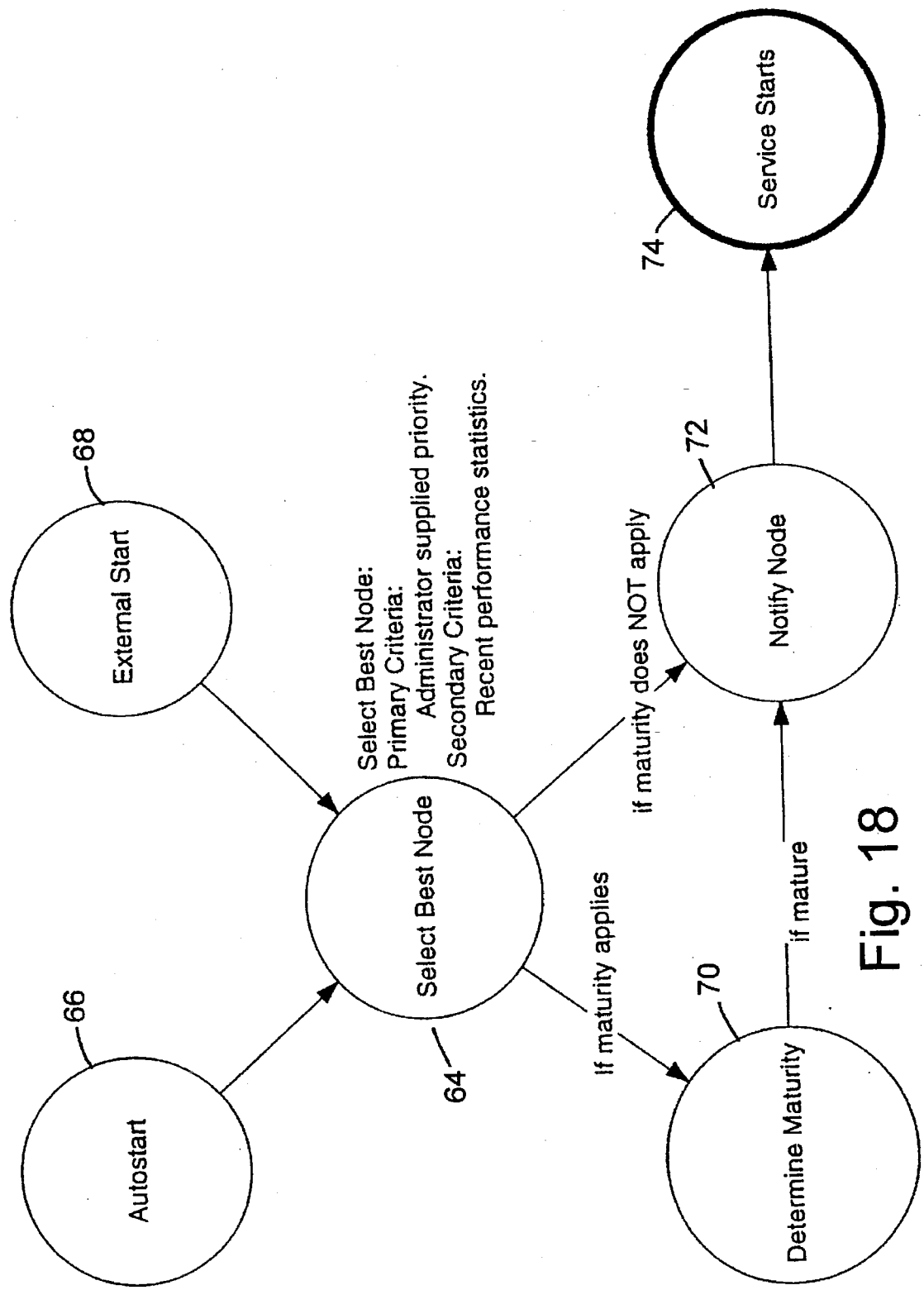
FIG. 18 is a state transition diagram illustrating the launching of a client service.
Figure 19:
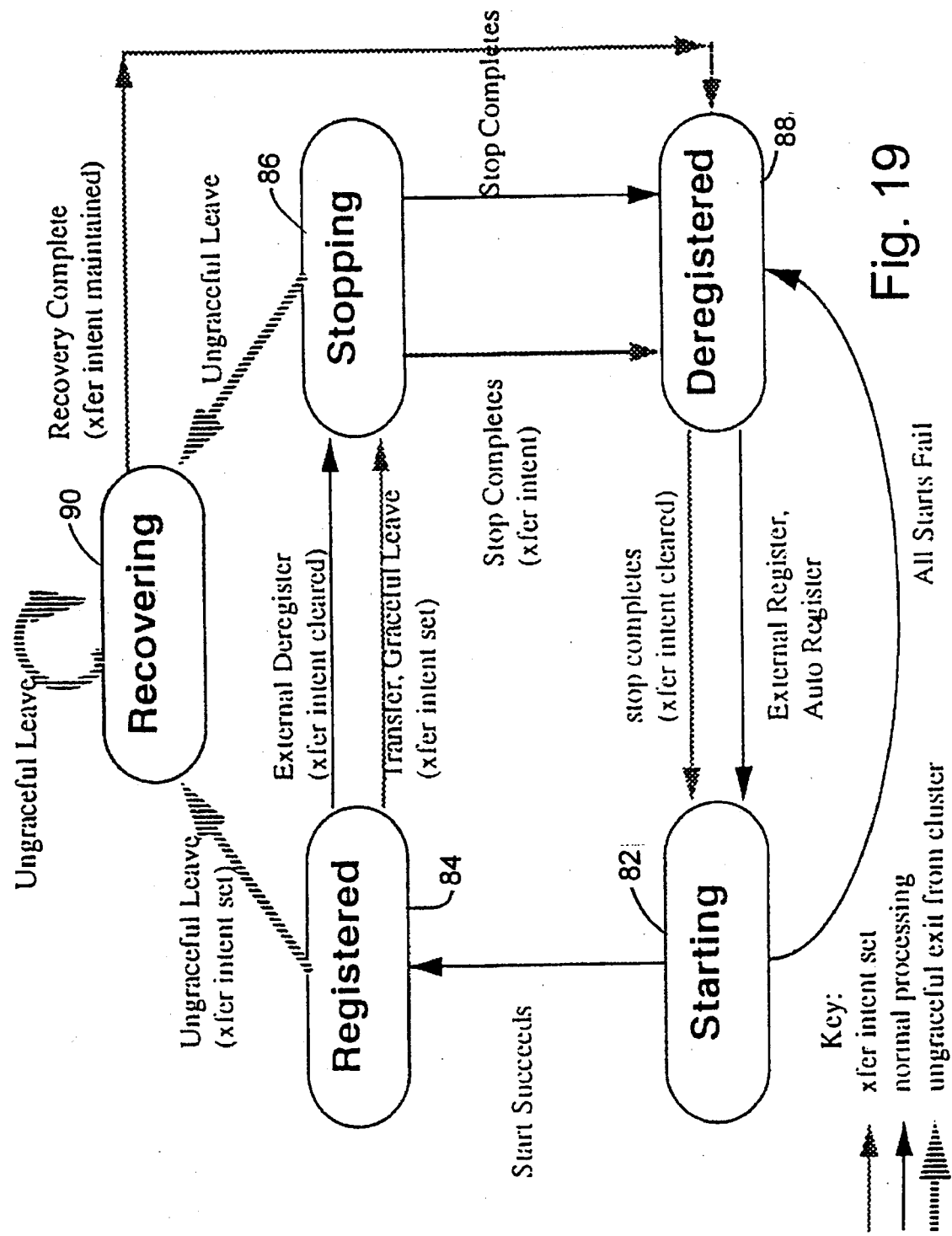
FIG. 19 is a state transition diagram illustrating the transition states of a client service.

As illustrated in FIG. 18, a client service may be started from either an auto-start 66 or an external start 68. The registration and launch service of a decision-making node selects the best node at 64 utilizing choosing parameters as previously set forth. The decision-making node can be any node in the cluster. It is determined by possession of a file lock and is processed using a cluster-wide semaphore. If maturity applies to the client service, the registration and launch service transfers to a state 70 awaiting maturity. Maturity refers to the maturity of the cluster. A cluster is mature with respect to a given client service if at least one node from the allowable_node's list is up and (a) the primary node is available, (b) enough nodes are up, or (c) enough time has gone by. Once the cluster is mature (70), or if maturity does not apply, the registration and launch service notifies (72) the selected node to start the service and the other nodes that the client service has been assigned to a particular node. The client service is then started or launched (74). Each registration and launch client service has independent choosing factors, except as described below (grouping).

3. Grouping

Figure 16:
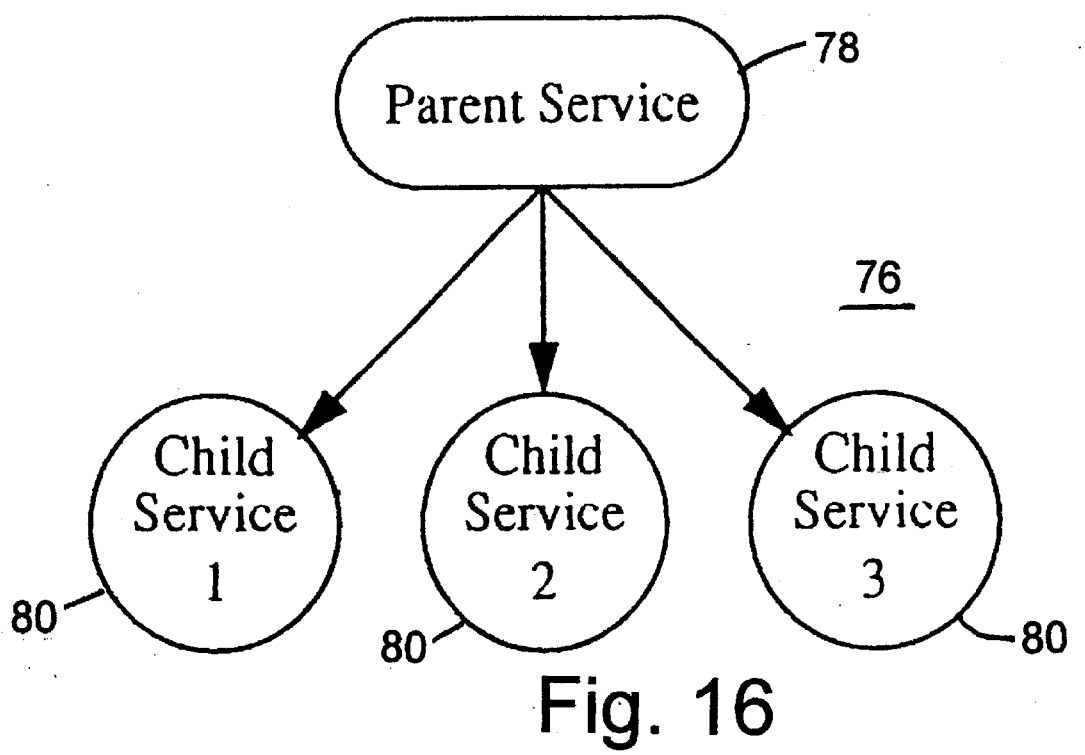
FIG. 16 is a block diagram illustrating the grouping of client services.
Figure 17:
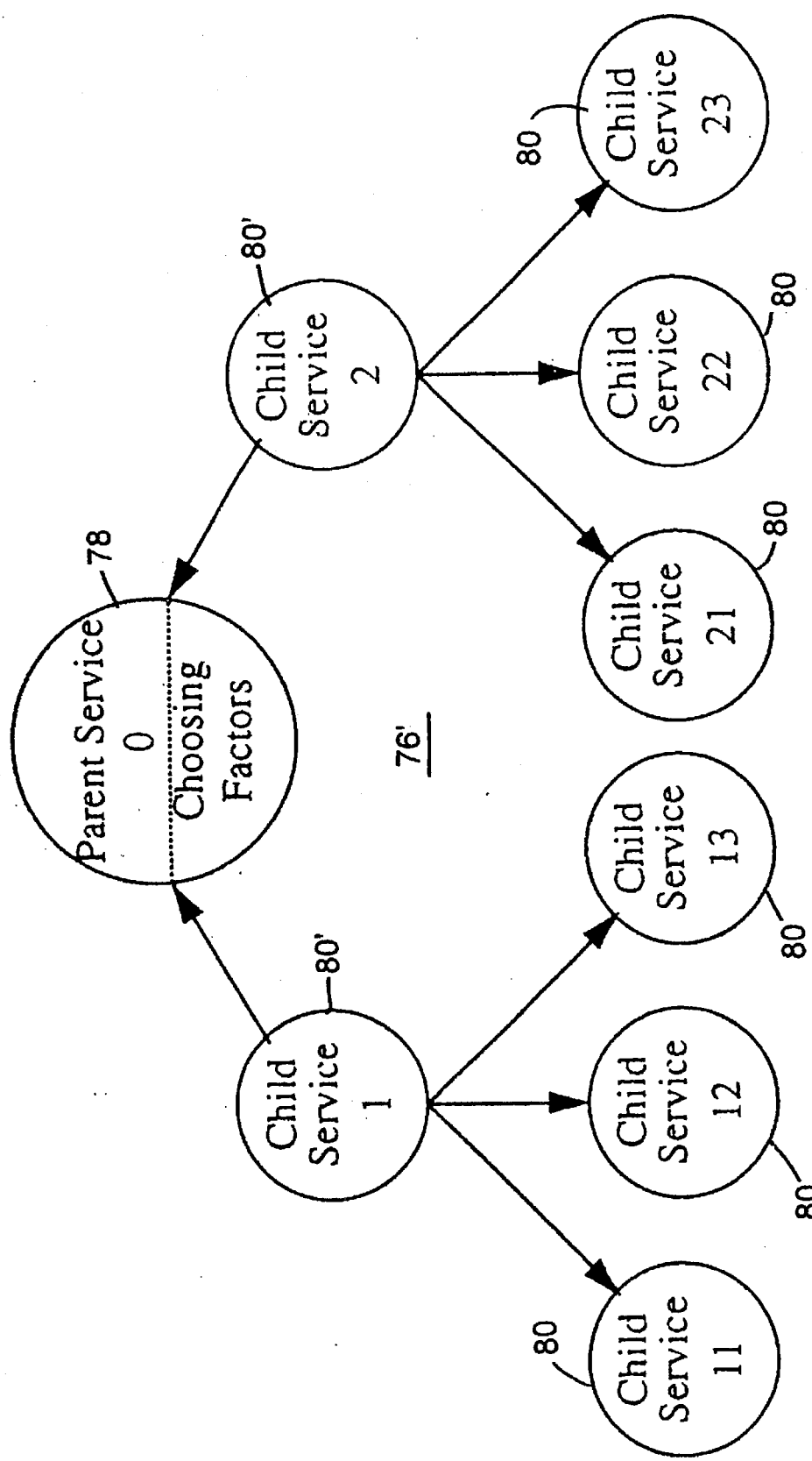
FIG. 17 is a diagram similar to FIG. 15 illustrating multiple generations of client service groupings.

Registration and launch service 56 allows client services to be associated with each other in an association known as a grouping 76 (FIGS. 16 and 17). The grouping mechanism is a relationship between a parent client service 78 and one or more child client services 80. The purpose of this grouping arrangement is to allow the administrator to specify associations where specific services must be placed together. The child will be placed wherever the parent is placed. Children services do not have any choosing factors; only the parents' choosing factors are used. A grouping 76' may include child services 80 that are children of another service 80', which is, in turn, the child of parent service 78, as illustrated in FIG. 17, all of the children (80 and 80') would be under the placement of parent service 78.

The registration for each child 80 is pended until its parent is successfully registered and its start_command, if any, has successfully completed. After the parent completes, each child is processed. Similarly, a de-registration of a parent implies the de-registration of the children. Children are de-registered first with stop_commands invoked as appropriate. When transferring a grouping 76, grouped children 80 are always stopped first and started last.

4. Action Functions

Registration and launch service 56 supports a variety of actions to take place as a consequence of registration transactions. Actions are the "launch" aspect of the registration and launch service. When combined with groupings 76 and choosing parameters 64, actions provide that many client services can depend entirely on the registration and launch service for cluster-wide availability. Initiation, migration, and termination may all be carried out directly with registration and launch service 56.

Registration and launch service 56 in the illustrated embodiment includes four action functions:

Start_Command—The database is checked to determine if such command is associated with the service upon successful registration of the client service. If such command is present, the client service is executed on the registered node. The registration is not complete until the start has completed successfully. If a start operation fails, an attempt is made to start the client service on another node in the allowable_node list.

Stop_Command—The database is checked to determine the presence of this command when a client service intends to terminate. The de-registration is not complete until the stop_command terminates.

Notify_Command—This command provides a mechanism whereby other nodes are informed that the client service has been assigned to a particular node. When a client service is successfully registered, the database is checked to determine if this command is associated with the service. If it is, it is executed on all nodes in the allowable-node list except the registered node. If a node in the allowable_node's list joins the cluster after a service is registered, and the service has a notify_command, the command is initiated on the new node. This includes nodes which leave and subsequently rejoin the cluster. If there is a start_command, the notification is pended until successful start.

Recovery_Command—This is used when a node ungracefully leaves the cluster. For each service registered on the forced out node, the database is checked to determine if there is a recovery_command associated with the service. If there is, it is executed. The node for the recovery operation is determined using the choosing parameters 64. When the recovery completes, the service is de-registered. Typically, the service will then be registered and started on one of the surviving nodes.

A concept closely related to an action function is that of transfer. Transfer of a service is accomplished through a combination of two action functions. First, the service is located and de-registered. Second, it is registered and started. A service transfer may be very helpful under various circumstances. In one circumstance, the administrator may wish to move a service. In another circumstance, the transfer function is used to transfer all of the services for a node that is being gracefully shut down. In another circumstance, the service, by its nature, may be trivial to move. Because there is no impact to moving it, such service may be automatically transferred when a preferred node joins the cluster if the service is placed on a node other than a preferred node.

When a client service is in the process of being transferred from one node to another, a "transfer intent" flag is set by the transferring node. Effect of the transfer intent flag on the transitions of registration and launch service 56 may be seen by reference to FIG. 19. Registration and launch service 56 includes a starting state 82, a registered state 84, a stopping state 86, a de-registered state 88, and a recovering state 90. Each of the stopping, starting, and recovering states will be skipped if their respective command does not exist. The starting state 82 indicates that the service is in the process of starting. If start is successful, the service goes to a registered state 84, which indicates that the service claims to be operational on some node. The registered service transfers to stopping state 86 if the transfer intent flag is set as part of transferring to another node in a graceful leave of the operational node. The registered service transfers to stopping state 86 as part of an external de-register or a transfer operation. Upon completion of the stopping command, the service transitions from the stopping state 86 to the de-registered state 88, indicating that the service is currently not registered and that no node transitions are currently underway. A service being transferred normally proceeds immediately from de-registered state 88 to starting state 82. Recovering state 90 only occurs if a node ungracefully leaves the cluster while the service was in the registered state 84 or in the stopping state 86. A more detailed state transition diagram is illustrated in FIG. 20, illustrating various intermediate states.

database because the up/down status of a node is not a state maintained in the database. At time $t_{12}$, node N1 begins a graceful leave which places the service in a stopping state. When stop completes at time $t_{13}$, the service becomes de-registered and the transfer intent flag is cleared.

TABLE 2

STATE TRANSITION EXAMPLE A

| Event | Time | Summary State | Summary Flags | Node N0 State | Node N0 Flags | Node N1 State | Node N1 Flags | Node N2 State | Node N2 Flags |
|---|---|---|---|---|---|---|---|---|---|
| | $t_0$ | — | | down | I | down | I | down | |
| N2 boots | $t_1$ | — | | down | I | down | I | up | |
| N0 boots | $t_2$ | — | M | up | I | down | I | up | |
| 5 minutes elapse | $t_3$ | Starting | | Starting | I | down | I | up | |
| Start completes | $t_4$ | Registered | | Registered | I | down | I | up | |
| N1 boots | $t_5$ | Registered | | Registered | I | up | I | up | |
| N2 gracefully leaves cluster | $t_6$ | Registered | | Registered | I | up | I | down | |
| N0 begins graceful leave | $t_7$ | Stopping | T | Stopping | I | up | I | down | |
| Stop completes | $t_8$ | — | T | | I | up | I | down | |
| | $t_9$ | Starting | T | — | I | Starting | I | down | |
| Start completes | $t_{10}$ | Registered | | ? ? | I | Registered | I | up | |
| N0 completes graceful leave | $t_{11}$ | Registered | | down | I | Registered | I | up | |
| N1 begins graceful leave | $t_{12}$ | Stopping | T | down | I | Stopping | I | up | |
| stop completes | $t_{13}$ | — | | down | I | — | I | up | |

T = transfer intent
M = awaiting maturity
I = available node set

Table 2 illustrates an example of state transition in a three-node cluster having nodes N0, N1, and N2. The example is based upon the allowable_nodes being node N0 and node N1, with a maturity_count equal to 2 and a maturity_time equal to 5. Auto_register is set to auto. The example applies to a single client service. At the beginning of the example, all nodes are down. At time $t_1$, node N2 boots so that the status of the node changes to an up condition. No change occurs for the service because node N2 is not in the allowable_node's list. At time $t_2$, the service is awaiting cluster maturity and node N0 boots. At time $t_3$, the maturity_time lapses and the service start_command is executed on node N0. Start completes at time $t_4$ and the service is registered on node N0. At time $t_5$, node N1 boots. Because the service is already registered, no action occurs. However, if a "notification action" is defined, it would be executed on node N1 at this time. At time $t_6$, node N2 gracefully leaves the cluster, which also has no influence on the service. At time $t_7$, node N0 begins a graceful leave. This results in the service being in the stopping state with the transfer intent set. Stopping is completed at time $t_8$. The service is transferred to node N1 in the starting state at time $t_9$. The service becomes registered on N1 at time $t_{10}$ when start completes. At time $t_{11}$, node N0 completes the graceful leave and goes down. This does not represent a change in the In an example illustrated in Table 3, node N0 is defined as a preferred node with the remaining nodes as allowable. The maturity_count is set to 2. Auto_register is set to auto. Placement_policy is set to register_on_one. Transfer_cost is free. At the beginning of the example, the three nodes, N0, N1, and N2, in the cluster are all down. At time $t_1$, node N0 boots and the service enters the starting state on node 0. At time $t_2$, start completes and the service is registered on node N0. At time $t_3$, node N1 boots and is notified that the service is registered on node N0. Between times $t_4$ and $t_7$, node N0 gracefully leaves the cluster. The service transfers to node N1 and is registered there. At time $t_8$, node N2 boots and is notified that the service is registered on node N1. At time $t_9$, node N0 boots and is notified that the service is registered on node 1. At time $t_{10}$, shortly after it boots, node N0 notices that free transfers are allowed and that it is preferred over node N1. Node N0 will automatically initiate a transfer. The service enters the stopping state 86 and stop completes at time $t_{11}$. At time $t_{12}$, the service enters the starting state on node N0. Starting is complete at time $t_{13}$ and the service is registered on node N0. Nodes N1 and N2 are notified that the service is registered on node N0.

TABLE 3

STATE TRANSITION EXAMPLE B

| Event | Time | Summary State | Summary Flags | Node N0 State | Node N0 Flags | Node N1 State | Node N1 Flags | Node N2 State | Node N2 Flags |
|---|---|---|---|---|---|---|---|---|---|
| | $t_0$ | — | N | down | I | down | I | down | I |
| 0 boots | $t_1$ | Starting | N | Starting | I | down | I | down | I |
| Start completes | $t_2$ | Registered | N | Registered | I | down | I | down | I |
| 1 boots | $t_3$ | Registered | N | Registered | I | -(notified) | I | down | I |
| 0 leaves cluster | $t_4$– $t_7$ | Registered | N | down | I | Registered | I | down | I |
| 2 boots | $t_8$ | Registered | N | down | I | Registered | I | -(notified) | I |
| 0 boots | $t_9$ | Registered | N | -(notified) | I | Registered | I | — | I |
| Takeover | $t_{10}$ | Stopping | N,T | — | I | Stopping | I | — | I |
| Stop completes | $t_{11}$ | — | N,T | — | I | — | I | — | I |
| | $t_{12}$ | Starting | N,T | Starting | I | — | I | — | I |
| Start completes | $t_{13}$ | Registered | N,T | Registered | I | -(notified) | I | -(notified) | I |

T = transfer intent
M = awaiting maturity
I = available node set
N = has notify

5. Event Manager Daemon

Registration and launch service 56 will automatically request event manager daemon 58 to monitor for a condition relating to a client service. Event manager daemon 58 responds by defining an event_group. The registration and launch service will request the event manager daemon to enable this event_group upon registration of the service and disable the event_group in response to de-registration of the service. If event manager daemon 58 detects a problem, an event action 62 will be invoked to resolve the problem. No direct communication will be returned to the registration and launch service.

Table 4 illustrates the fields associated with an event monitored by event manager daemon 58. In addition to the event name field, there are fields for IN parameters and OUT parameters which define the event that the appropriate event watcher is set to detect and the OUT parameters are filled in when the event occurs. The output is made available to the action function 62 associated with the particular event. Event_groups are used to logically associate otherwise independent events in order to specify when, where, and under what conditions to enable them.

TABLE 4

EVENT MANAGER DAEMON

| Field | Description |
|---|---|
| Event Name | A string that identifies an event instance; it is unique within the cluster. |
| IN Parameters | A fixed set of name-value pairs that define an event; they are used by the appropriate event watcher to detect the event. |
| OUT Parameters | A fixed set of name-value pairs that describe an occurrence of the event. |
| Action Function | This command line describes what happens if the event occurs; it may reference values from the IN and OUT parameters. |

In event manager subsystem 54, event manager daemon 58 is the center of control. All watchers 60a–60g connect via a communication library to the event manager daemon. One of the watchers provided in event manager subsystem 54 is membership manager watcher 60e, which receives notifications from membership manager subsystem 46 of node transitions in the manner previously described and provides an interface to transition notification framework 44. Event manager subsystem 54 provides awareness to registration and launch service 56 of such node transitions.

One example of an application for which registration and launch service 56 is especially apropos is to provide a floating license server on cluster system 25. The licensed software could be established as a service and could be allowed to execute on a given number of nodes in the cluster. The registration and launch service will run the start program that brings up the licensed software on one of the nodes. If that node goes down gracefully, or ungracefully, the registration and launch service will transfer the licensed software to a new node, after recovery if the leave was ungraceful.

Thus, it is seen that the present invention provides a tightly coordinated cluster membership manager framework which coordinates the joining or leaving among all nodes in a cluster, including taking the multiple layers of involved subsystems through the transitions. One of the subsystems may be in user space and carries out the transfers of client services, including user applications, resulting from nodes joining and leaving the cluster. Other user space applications may register with the membership manager transition notification framework at run time. Thus, a robust system is provided which enhances the high aggregate performance of the multiprocessor cluster technology.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. In a multiprocessor system having multiple nodes, a shared resource accessible to all nodes and multiple interdependent levels of subsystems on each of said nodes, a method of combining particular ones of said nodes in a cluster so that it appears to users that the entire cluster is substantially a single node containing said shared resource, said method including notifying all levels of subsystems running on nodes presently in the cluster of transitions of nodes joining and leaving the cluster in order to provide a consistent view of active membership in the cluster.

2. The method of claim 1 wherein the subsystems are interdependent in levels, with higher level subsystems dependent on the operation of lower level subsystems.

3. The method of claim 2 including notifying one of said subsystems on all of said nodes presently in the cluster of a transition, processing that notification at said one of said subsystems prior to notifying another of said subsystems on all of said nodes presently in the cluster of the transition.

4. The method of claim 3 including notifying subsystems beginning with lower level subsystems and proceeding in sequence through higher levels of subsystems of a transition of a node joining the cluster.

5. The method of claim 3 including notifying subsystems beginning with higher lever subsystems and proceeding in sequence through lower levels of subsystems of a transition of a node gracefully leaving the cluster.

6. The method of claim 3 including notifying subsystems beginning with lower level subsystems and proceeding in sequence through higher levels of subsystems of a transition of a node forced from the cluster by other processors.

7. The method of claim 2 wherein said subsystems include a higher level subsystem which interacts with user programs.

8. The method of claim 7 wherein said higher level subsystem includes a service which automatically and atomically transfers user programs to other nodes when the node executing the user programs leaves the cluster.

9. The method of claim 2 wherein said subsystems include a distributed lock manager subsystem, a virtual disk manager subsystem and a shared file subsystem.

10. The method of claim 1 wherein for a transition of a node joining the cluster, said method includes the steps of:
   a) registering subsystems of the joining node to receive transition notifications;
   b) joining the node to the cluster; and
   c) notifying registered subsystems in the cluster that the joining node has joined the cluster.

11. The method of claim 1 wherein for a transition of one node being forced out of the cluster by another node, said method includes the steps of:
   a) the another node notifying registered subsystems that the one node is being forced out of the cluster; and
   b) transferring registered programs executing on said one node atomically to a different node and recovering the programs to execute on said different node.

12. In a multiprocessor system having multiple nodes, a shared resource accessible to all nodes and multiple interdependent levels of subsystems on each of said nodes, a method of initiating client services on particular ones of said nodes in a cluster so that it appears to said client services that the entire cluster is substantially a single node containing said shared resource, said method including choosing a node for each client service, registering the client service with that node, and notifying nodes presently in the cluster that the particular client service is registered with the particular node, whereby the particular service can be transferred to another node if the particular node leaves the cluster.

13. The method of claim 12 further including launching a client service on a node according to an action parameter included with the client service in response to registering that client service with that node.

14. The method of claim 13 further including grouping client services as a parent client service and at least one child client service, registering grouped client services with the same node and launching grouped client services according to an action parameter included with the parent client service.

15. The method of claim 12 wherein said choosing a node includes providing a database of choosing factors for the client service and applying said choosing factors to the nodes presently in the cluster, said choosing factors establishing rules relating nodes to the client service.

16. The method of claim 15, wherein said choosing factors are selected from the group including allowable nodes, disallowable nodes and node preferences.

17. The method of claim 12 further including notifying nodes joining the cluster that the particular client service is registered with the particular nodes.

18. The method of claim 12 including monitoring a client service registered with a node at that node using an event watcher.

19. The method of claim 18 including enabling the event watcher in response to registering the client service and disabling the event watcher in response to de-registering the client service.

20. The method of claim 12 wherein said multiple subsystems includes a cluster membership manager which controls which of said nodes are presently in the cluster and wherein said cluster membership manager provides notification of which nodes are in the cluster.

21. The method of claim 20 wherein said initiating services on a particular one of said nodes is performed by another one of said multiple subsystems.

22. A multiprocessor cluster system having multiple nodes, a shared resource accessible to all nodes, a cluster communication medium between said nodes, and multiple subsystems on each of said nodes, comprising:
   a cluster membership manager subsystem adapted to notify subsystems running on nodes presently in the cluster of transitions of nodes joining and leaving the cluster in order to provide a consistent view of active membership in the cluster;
   an event manager subsystem adapted to detect and react to cluster errors; and
   a registration and launch service responsive to said event manager and adapted to initiate client services on particular ones of said nodes in a cluster so that it appears to said client services that the entire cluster is substantially a single node containing said shared resource, wherein said registration and launch subsystem chooses a node for each client service, registers the client service with that node, and notifies nodes presently in the cluster that the particular service is registered with the particular node.

23. The multiprocessor cluster system in claim 22 wherein the subsystems are interdependent in levels, with higher level subsystems dependent on the operation of lower level subsystems.

24. The multiprocessor cluster system in claim 23 wherein said membership manager subsystem notifies one of said subsystems on all of said nodes presently in the cluster of a transition, and that one of said subsystems on all nodes processes that notification prior to said membership manager subsystem notifying another of said subsystems on all of said nodes presently in the cluster of the transition.

25. The multiprocessor cluster system in claim 24 wherein said membership manager notifies subsystems beginning with lower level subsystems and proceeding in sequence through higher levels of subsystems of a transition of a node joining the cluster.

26. The multiprocessor cluster system in claim 24 wherein said membership manager notifies subsystems beginning with higher level subsystems and proceeding in sequence through lower levels of subsystems of a transition of a node gracefully leaving the cluster.

27. The multiprocessor cluster system in claim 24 wherein said membership manager notifies subsystems beginning with lower level subsystems and proceeding in sequence through higher levels of subsystems of a transition of a node forced from the cluster by other processors.

28. The multiprocessor cluster system in claim 22 wherein said registration and launch service launches a client service on a node according to an action parameter included with the client service in response to registering that client service with that node.

29. The multiprocessor cluster system in claim 28 wherein said registration and launch service is adapted to group client services as a parent client service and at least one child client service, and wherein said registration and launch service further registers grouped client services with the same node and launches grouped client services according to an action parameter included with the parent client service.

30. The multiprocessor cluster system in claim 22 wherein said registration and launch service includes a database of choosing factors for the client service and applies said choosing factors to the nodes presently in the cluster to choose the node for registering a client service, said choosing factors establishing rules relating nodes to the client service.

31. The multiprocessor cluster system in claim 22 wherein said registration and launch service further notifies nodes joining the cluster that the particular client service is registered with the particular node.

32. The multiprocessor cluster system in claim 22 wherein said event manager includes an event watcher for monitoring a client service registered with a node at that node.

33. A computer usable medium in which program code is embodied, said program code defining an operating system for a multiprocessor cluster system having multiple nodes, a shared resource accessible to all processors, and including multiple interdependent levels of subsystems, one of said subsystems being a cluster membership manager subsystem which defines a computer process for combining particular ones of said nodes in a cluster so that it appears to users that the entire cluster is substantially a single node containing the shared resource, said cluster membership manager subsystem adapted to notify all levels of subsystems running on nodes presently in a cluster of transitions of nodes joining and leaving the cluster in order to provide a consistent view of active membership in the cluster.

34. A computer usable medium in which program code is embodied, said program code defining an operating system for a multiprocessor cluster system having multiple nodes, a shared resource accessible to all processors, and including a registration and launch service which defines a computer process for allocating said nodes to perform client services, said registration and launch service adapted to initiate client services on particular ones of nodes so that it appears to said client services that the entire cluster is substantially a single node containing said shared resource, wherein said registration and launch service chooses a node for each client service, registers the client service with that node, and notifies nodes presently in the cluster that the particular service is registered with the particular node.

35. A computer usable medium in which program code is embodied, said program code defining an operating system for a multiprocessor cluster system having multiple nodes, and a shared resource accessible to all nodes, comprising:

multiple subsystems that are interdependent in levels, with higher level subsystems dependent on the operation of lower level subsystems;

one of said subsystems comprising a cluster membership manager subsystem which defines a computer process for combining particular ones of said nodes in a cluster so that it appears to users that the entire cluster is substantially a single node containing the shared resource, said cluster membership manager subsystem adapted to notifying subsystems running on nodes presently in a cluster of transitions of processors joining and leaving the cluster in order to provide a consistent view of active membership in the cluster; and one of said subsystems including a registration and launch service which defines a computer process for allocating said nodes to perform client services, said registration and launch service adapted to initiate client services on particular ones of said nodes in a cluster so that it appears to said client services that the entire cluster is substantially a single node containing said shared resource, wherein said registration and launch service chooses a node for each client service, registers the client service with that node, and notifies nodes presently in the cluster that the particular service is registered with the particular node.

36. In a multiprocessor system having multiple nodes, and a shared resource accessible to all nodes, a method of initiating client services on particular ones of said nodes in a cluster so that it appears to said client services that the entire cluster is substantially a single node containing said shared resource, said method including providing a registration and launch service which defines a computer process, said registration and launch service adapted to selecting one of said nodes for a client service, registering that client service with the selected node and launching that client service on the selected node according to an action parameter included with that client service in response to registering that client service with the selected node.

37. The method in claim 36 including transferring the client service to another node if that node leaves the cluster.

38. The method in claim 36 wherein said transferring includes relaunching the client service on the another node according to said action parameter.

39. In a multiprocessor system having multiple nodes, a shared resource accessible to all nodes and multiple interdependent levels of subsystems on each of said nodes, a method of combining particular ones of said nodes in a cluster so that it appears to users that the entire cluster is substantially a single node containing the shared resource, said method including taking said levels of said subsystems through node transitions in a manner that a particular level of said subsystems is taken through a node transition at all said ones of said nodes prior to taking a different level of said subsystems through the node transition.

40. The method of claim 39 wherein a higher level of said subsystems is dependent on the operation of a lower level of said subsystems.

41. The method of claim 40 including taking a lower level of said subsystems through a node transition prior to taking a higher level of said subsystems through the node transition if the node transition is a node joining the cluster.

42. The method of claim 40 including taking a lower level of said subsystems through a node transition prior to taking a higher level of said subsystems through the node transition if the node transition is a node ungracefully being forced from the cluster by other nodes.

43. The method of claim 40 including taking a higher level of said subsystems through a node transition prior to taking a lower level of said subsystems through the node transition if the node transition is a node gracefully leaving the cluster.

44. A computer usable medium in which program code is embodied, said program code defining an operating system for a multiprocessor cluster system having multiple nodes, and a shared resource accessible to all nodes, and including multiple interdependent levels of subsystems; one of said subsystems being a cluster membership manager subsystem which defines a computer process for combining particular ones of said nodes in a cluster for that it appears to users that the entire cluster is substantially a single node containing the shared resource, said cluster membership manager subsystem adapted to taking all levels of subsystems through node transitions in a manner that a particular level of said subsystems is taken through a node transition at all said ones of said nodes prior to taking a different level of said subsystems through the node transition.

* * * * *